US012743703B2

(12) United States Patent
Svidler

(10) Patent No.: US 12,743,703 B2

(45) Date of Patent: Sep. 22, 2026

(54) SYSTEMS AND METHODS FOR DIGITAL ONBOARDING USING ERP DATA

(71) Applicant: Wells Fargo Bank, N.A., San Francisco, CA (US)

(72) Inventor: Art Svidler, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 264 days.

(21) Appl. No.: 18/205,793

(22) Filed: Jun. 5, 2023

(65) Prior Publication Data

US 2024/0403887 A1 Dec. 5, 2024

(51) Int. Cl.
*G06Q 30/00* (2023.01)
*G06Q 30/01* (2023.01)

(52) U.S. Cl.
CPC .................................. *G06Q 30/01* (2013.01)

(58) Field of Classification Search
None
See application file for complete search history.

(56) References Cited

U.S. PATENT DOCUMENTS

2002/0035631 A1* 3/2002 Chung ................ H04L 12/5692 709/227
2004/0083426 A1 4/2004 Sahu
2009/0100174 A1* 4/2009 Annareddy ........... G06F 15/173 709/224
2012/0203880 A1* 8/2012 Kluyt ........................ G06F 9/54 709/223
2013/0110724 A1* 5/2013 Edwards ............. G06Q 20/042 705/45
2016/0050259 A1 2/2016 Banerjee et al.
2022/0138337 A1* 5/2022 Wilhelm ............ G06Q 30/0185 726/1
2023/0412607 A1* 12/2023 Maladwalla .......... G06F 21/604

OTHER PUBLICATIONS

The APIs Have It: A beautiful synergy between treasury systems is on the rise. By: Daly, Rob; In: Global Finance, Mar. 2023. (Year: 2023).*

Koberl, H. Bock and C. Steger, "A Novel Approach for Providing Client-Verifiable and Efficient Access to Private Smart Contracts," 2022 IEEE Conference on Dependable and Secure Computing (DSC), Edinburgh, United Kingdom, 2022. (Year: 2022).*

(Continued)

*Primary Examiner* — Matthew T Sittner
(74) *Attorney, Agent, or Firm* — Foley & Lardner LLP

(57) ABSTRACT

Systems and methods for establishing a connection between a first computing system and a first application hosted on one or more remote servers may include receiving, from a computing device, a request to establish a new account with the first computing system, determining a dataset for establishing the new account with the first computing system, the dataset including a first data entry and a second data entry, polling one or more servers of the first computing system for first data to satisfy the first data entry, transmitting a query via the connection to an application program interface (API) for the first application for second data to satisfy the second entry, and establishing the new account with the first computing system based on the first data and the second data.

14 Claims, 10 Drawing Sheets

(56) References Cited

OTHER PUBLICATIONS

Nandyal and M. Rafi, "Determining Feature Gaps Of Open Source Cloud Platforms for Mobile Backend as service (MBaaS) in Enterprise Mobile Applications," 2020 IEEE International Conference on Distributed Computing, VLSI, Electrical Circuits and Robotics (DISCOVER), Udupi, India, 2020 (Year: 2020).*

Bank CRM: Enable Digital Customer Onboarding in Ease (6 pages) dated May 17, 2022 (Year: 2022) https://www.toolyt.com/blog/bank-crm-enable-digital-customer-onboarding-in-ease/.

* cited by examiner

SYSTEMS AND METHODS FOR DIGITAL ONBOARDING USING ERP DATA

TECHNICAL FIELD

The present disclosure relates to systems and methods for onboarding a new Enterprise Resource Planning (ERP) account. More specifically, the present disclosure relates to systems and method of automatically gathering user data via one or more Application Program Interfaces and creating an Enterprise Resource Planning account for the user

BACKGROUND

Businesses often use various software platforms to manage their business processes, interactions with customers, and overall day-to-day operations. For example, businesses often use an enterprise resource planning (ERP) platform to manage main business processes (e.g., finance, human resources, etc.), a customer relationship management (CRM) platform to manage the business's interactions with existing and potential customers, and third-party platforms for other day-to-day operations (e.g. financial, banking, etc.). Although businesses move between these software platforms many times a day, these platforms are often fragmented and difficult to move between easily. As such businesses are often forced to increase time, decrease efficiency, and increase overall cost in moving between these platforms in order to manage the business.

SUMMARY

Systems, methods, and computer-readable media for establishing, by one or more processors of a first computing system, a connection between the first computing system and a first application hosted on one or more remote servers, receiving, by the one or more processors, from a computing device, a request to establish a new account with the first computing system, determining, by the one or more processors, a dataset for establishing the new account with the first computing system, the dataset including a first data entry and a second data entry, polling, by the one or more processors, one or more servers of the first computing system for first data to satisfy the first data entry, transmitting, by the one or more processors, a query via the connection to an application program interface (API) for the first application for second data to satisfy the second entry, and establishing, by the one or more processors, the new account with the first computing system based on the first data and the second data are disclosed, according to various embodiments.

In some embodiments, the method further includes determining, by the one or more processors, to poll the one or more servers for the first data and to transmit the query to the API for the first application for the second data, based on a first type of the first data and a second type of the second data. The first application may be an enterprise resource planning (ERP) application. The method may further include transmitting, by the one or more processors, a second query to a second API for a third-party source, for third data to satisfy a third query. The method may further include applying, by the one or more processors, a policy for access rights by a user of the computing device via the connection to the first application hosted on the one or more remote servers, to determine whether the user may be permitted to access the first data and the second data. The method may further include retrieving, by the one or more processors, responsive to establishing the connection, a policy set from the first computing system, the policy set including access rights for a plurality of users including the user. An entity corresponding to the computing device maintains a first account with the first computing system, the new account may be a second account with the first computing system and the method may further include retrieving, by the one or more processors, data from the first account for establishing the second account with the first computing system. The method may further include transmitting, by the one or more processors, a user interface to the computing device, the user interface identifying the first data, the second data, and requesting third data from a user of the computing device for establishing the new account and receiving, by the one or more processors, a confirmation of the first data and the second data, and the third data from the user of the computing device.

Another embodiment is related to a computing system having one or more processors configured to establish a connection between the computing system and a first application hosted on one or more remote servers, receive, from a computing device, a request to establish a new account with the computing system, determine a dataset for establishing the new account with the computing system, the dataset including a first data entry and a second data entry, poll one or more servers of the computing system for first data to satisfy the first data entry, transmit a query via the connection to an application program interface (API) for the first application for second data to satisfy the second entry, and establish the new account with the computing system based on the first data and the second data.

The one or more processors may be further configured to determine to poll the one or more servers for the first data and to transmit the query to the API for the first application for the second data, based on a first type of the first data and a second type of the second data. The first application may be an enterprise resource planning (ERP) application. To establish the connection, the one or more processors may be configured to configure the connection for access to a first type of data from the one or more remote servers while a second type of data from the one or more remote servers may be inaccessible. The one or more processors may be further configured to transmit a second query to a second API for a third-party source, for third data to satisfy a third query. The one or more processors may be further configured to apply a policy for access rights by a user of the computing device via the connection to the first application hosted on the one or more remote servers, to determine whether the user may be permitted to access the first data and the second data. The one or more processors may be further configured to retrieve, responsive to establishing the connection, a policy set from the computing system, the policy set including access rights for a plurality of users including the user. An entity corresponding to the computing device may maintain a first account with the computing system, the new account may be a second account with the first computing system and the one or more processors may be configured to retrieve data from the first account for establishing the second account with the computing system. The one or more processors may be further configured to transmit a user interface to the computing device, the user interface identifying the first data, the second data, and requesting third data from a user of the computing device for establishing the new account, and receive a confirmation of the first data and the second data, and the third data from the user of the computing device.

Another embodiment is related to a non-transitory computer readable medium storing instructions that, when executed by one or more processors, cause the one or more processors to establish a connection between a computing system and a first application hosted on one or more remote servers, receive, from a computing device, a request to establish a new account with the computing system, determine a dataset for establishing the new account with the computing system, the dataset including a first data entry and a second data entry, poll one or more servers of the computing system for first data to satisfy the first data entry, transmit a query via the connection to an application program interface (API) for the first application for second data to satisfy the second entry, and establish the new account with the computing system based on the first data and the second data.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

Before turning to the Figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

DETAILED DESCRIPTION

Figure 1:
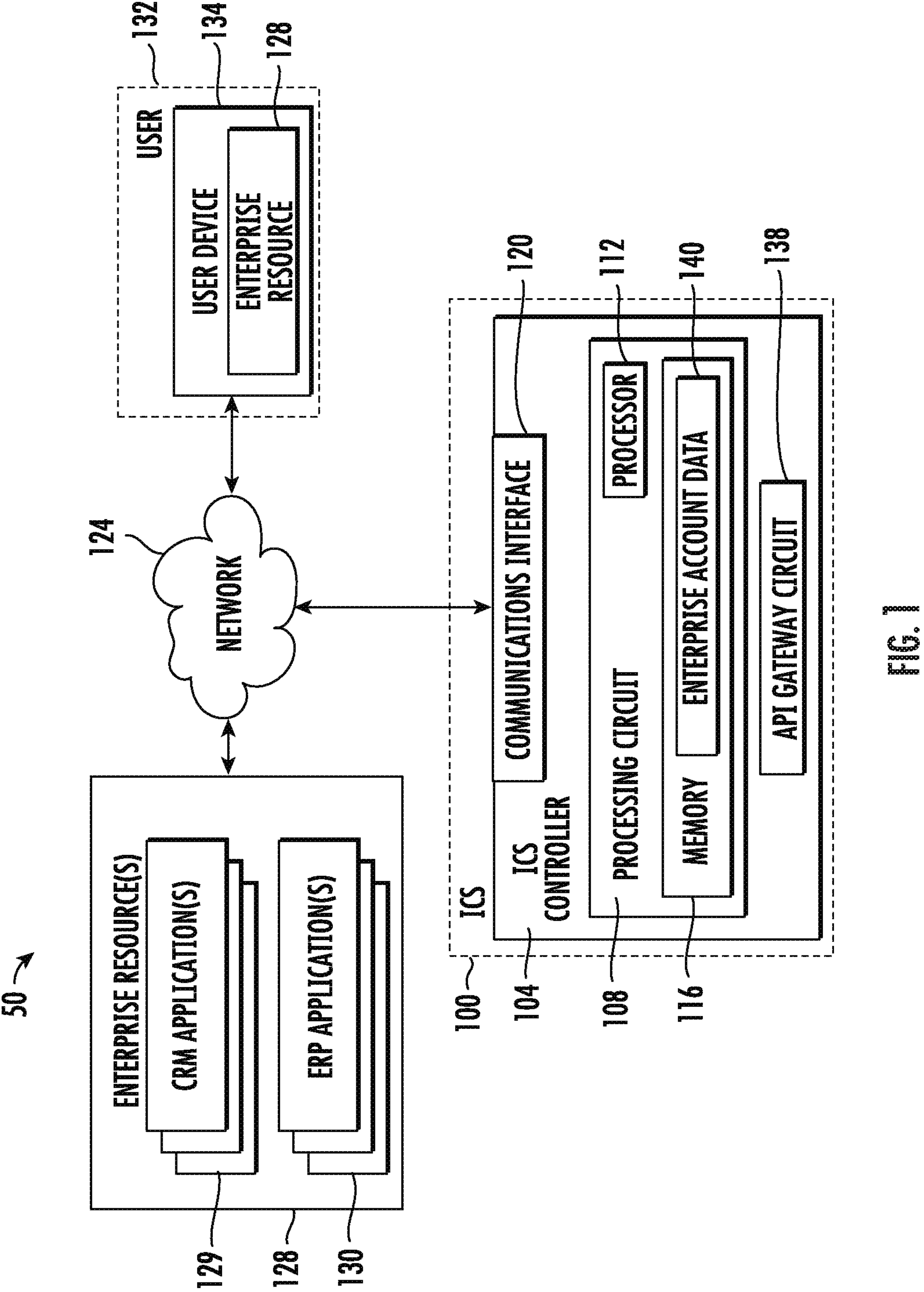
FIG. 1 is a schematic diagram of a computing system, according to an exemplary embodiment.

Following below are more detailed descriptions of various concepts related to, and implementations of, systems and methods for delivering content (such as content relating to products or services offered via an institution) using an institution computing system (ICS) to an enterprise resource, such as an enterprise resource planning (ERP) application, a customer relationship management (CRM) application, accounting systems, treasury management platforms, and/or any other system that is regularly utilized by an entity. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

In various implementations, an enterprise may maintain various applications and resources which are used in day-to-day operations. For example, an enterprise may maintain, use, or otherwise access various enterprise resources. Such resources may be or include customer relationship management (CRM) applications (e.g., for establishing leads on new customers, assisting in converting a lead to a sale, planning delivery, and so forth), enterprise resource planning (ERP) applications, such as human resources (HR) or payroll applications, marketing applications, customer service applications, operations/project/supply chain management applications, commerce design applications, accounting systems, treasury management platforms and the like. Each of these applications may be maintained as part of suite or platform of applications which are accessible by various users associated with the enterprise. The enterprise resources may be locally-hosted applications or resources (e.g., executing on various computing devices of the enterprise), or cloud-hosted or web-based applications or resources provisioned to the enterprise computing devices and systems by one or more third parties. For example, the enterprise resources may be or include a software suite or platform including a plurality of enterprise resources, which are accessible by enterprise computing devices or systems.

According to various examples, when a user subscribes to the enterprise resources services, the user completes an onboarding process. The onboard process may require significant manual input and may require the user to manually push documents and/or data to a computing system associated with the enterprise resources. Further, a financial institution that hosts an account associated with the user may be required to provide financial data associated with the user as a part of the onboarding process. The required data needed as a part of the onboarding process may depend on the services being requested by the user.

According to an exemplary embodiment, an institution computing system (ICS) is provided that facilitates connections and communications between enterprise resources (e.g., remotely hosted and/or locally executing applications) and an institution through a network of application programming interfaces (APIs). The ICS may include any number of APIs which are configured to facilitate communications and exchange of content and data with enterprise resources. The ICS is configured to pull content and data associated with the user from the institution computing system associated with the user account. Further, the ICS is configured to pull data from an existing ERP application, CRM application (e.g., installed and/or executing locally on the user device, or hosted on one or more servers and accessed via the user device), or document database to automate at least a portion of the onboarding process. With this in mind, an ICS may send various API calls to the enterprise resources, requesting the enterprise resources to communicate content and data in real-time. In various embodiments, the ICS provides various APIs that facilitate real-time interaction between the ICS and enterprise resources. By utilizing one or more APIs to pull data from the enterprise resources, rather than the data being manually pushed to the ICS, the ICS may accelerate the onboarding process and reduce amount of manual intervention.

According to the examples and embodiments described herein, the ICS leverages an OCR engine to extract data from one or more documents pulled from the enterprise resources. The extracted data may be provided to a data ingestion engine and/or a ML model as a part of the onboarding process.

According to various embodiments, the ML model optimizes the datasets that are stored in the ICS. For example, the OCR engine may provide the datasets pulled from the enterprise resources and the datasets may be used as input to the ML model. The ML model may determine which datasets include the data required to onboard the user. Further, the ML model may determine which datasets include unnecessary data and limit the amount of unneeded data stores on the ICS.

According to various embodiments, leveraging a ML model to optimize the datasets stored on the ICS may reduce the required computing capacity required to complete the onboarding process by reducing the data saved on the ICS. Further, some users may request that only the data needed be shared with the ICS while reducing the amount of unnecessary data shared. Leveraging a ML model to optimize the datasets stored may reduce the amount of unnecessary data provided the ICS. Various other examples and embodiments are described in greater detail herein.

For purposes of reading the description of the various embodiments below, the following enumeration of sections of the specification of their respective contents are provided:

Section I: Integrating Enterprise Resource and Institution Computing System;

Section II: Machine Learning Model(s); and

Section III: Systems and Methods for Digital Onboarding Using ERP Data

Section I: Integrating Enterprise Resource and Institution Computing System. Referring now to FIG. 1, a schematic diagram of a computing system 50 is shown, according to an exemplary embodiment. Computing system 50 is shown to include an institution computing system (ICS) 100, which includes an ICS controller 104. The ICS controller 104 includes a processing circuit 108, having a processor 112 and a memory 116. The ICS controller 104 may also include, and the processing circuit 108 may be communicably coupled to, a communications interface 120 such that the processing circuit 108 may send and receive content and data via the communications interface 120. As such, the ICS controller 104 may be structured to communicate via one or more networks 124 with other devices and/or applications. The computing system 50 is shown to include enterprise resources 128 including a plurality of CRM applications 129 and a plurality of ERP applications 130, and a user device 134 accessing an enterprise resource 128 (which may be one of the enterprise resources 128). It should be appreciated that enterprise resources 128 may further include accounting systems, treasury management platforms, and other platforms utilized by the enterprise. In some embodiments, the ICS controller 104, the enterprise resources 128, and the user device 134 may be communicably coupled and configured to exchange data over the network 124, which may include one or more of the Internet, cellular network, Wi-Fi, Wi-Max, a proprietary banking network, a proprietary retail or service provider network, or other type of wired or wireless network. The ICS controller 104 may be configured to transmit, receive, exchange, or otherwise provide data to one or more of the enterprise resources 128. The ICS controller 104 is shown to include an application programming interface (API) gateway circuit 138. The API gateway circuit 138 may be configured to facilitate the transmission, receipt, and/or exchange of data between the ICS controller 104 and the enterprise resources 128.

Referring to FIG. 1 generally, the ICS controller 104 is associated with (e.g., owned, managed, and/or operated by) the institution computing system (ICS) 100. In the example depicted, the ICS 100 is a computing system configured to maintain data or content relating to one or more one or more enterprises (e.g., enterprise account data 140). According to the embodiments described herein, the ICS 100 may be configured to transmit existing enterprise account data 140 to one or more enterprise resources 128. For example, the ICS 100 may be configured to provide various content and data relating to different institution accounts, such as general ledger accounts, lending, money transfers, issuing credit or debit, etc. Thus, the ICS controller 104 is structured or configured to maintain and provide, or otherwise facilitate providing, the content and data (e.g., the enterprise account data 140) to devices and/or applications associated with internal or external users (e.g., users having an account with the institution corresponding to the ICS 100, users seeking to establish an account with the institution, etc.). In some embodiments, the ICS controller 104 is structured or configured control access to the enterprise account data 140 (e.g., by authenticating an enterprise resource 128 or a user of the enterprise resource 128).

In some embodiments, the ICS controller 104 may be implemented within a single computer (e.g., one server, one housing, etc.). In other embodiments, the ICS controller 104 may be distributed across multiple servers or computers, such as a group of two or more computing devices/servers, a distributed computing network, a cloud computing network, and/or any other type of computing system capable of accessing and communicating via local and/or global networks (e.g., the network 124). Further, while FIG. 1 shows applications outside of the ICS controller 104 (e.g., the network 124, the enterprise resources 128, etc.), in some embodiments, one or more of the enterprise resources 128 may be hosted within the ICS controller 104 (e.g., within the memory 116).

As shown in FIG. 1, the ICS controller 104 is shown to include the processing circuit 108, including the processor 112 and the memory 116. The processing circuit 108 may be structured or configured to execute or implement the instructions, commands, and/or control processes described herein with respect to the processor 112 and/or the memory 116. FIG. 1 shows a configuration that represents an arrangement where the processor 112 is embodied in a machine or computer readable media, as described below. However, FIG. 1 is not meant to be limiting as the present disclosure contemplates other embodiments, such as where the processor 112, or at least one circuit of processing circuit 108 (or ICS controller 104), is configured as a hardware unit. All such combinations and variations are intended to fall within the scope of the present disclosure.

The processing circuit 108 is shown to include the processor 112. The processor 112 may be implemented or performed with a general purpose single- or multi-chip processor, a digital signal processor (DSP), an application specific integrated circuit (ASIC), one or more field programmable gate array (FPGAs), or other suitable electronic processing components. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the circuits of the processor 112 may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The processing circuit 108 is also shown to include the memory 116. The memory 116 (e.g., memory, memory unit, storage device, etc.) may include one or more devices (e.g., RAM, ROM, Flash memory, hard disk storage, etc.) for storing data and/or computer code for completing or facilitating the processes, layers, and modules described in the present application. The memory 116 may be or include tangible, non-transient volatile memory or non-volatile memory. The memory 116 may also include database components, object code components, script components, or any other type of information structure for supporting the activities and information structures described in the present application. According to an exemplary embodiment, the memory 116 is communicably connected to the processor 112 via the processing circuit 108 and includes computer code for executing (e.g., by the processing circuit 108 and/or the processor 112) one or more processes described herein.

As shown in FIG. 1, the ICS controller 104 is also shown to include an application programming interface (API) gateway circuit 138. In some embodiments, the external devices (e.g., CRM application(s) 129 or ERP application(s) 130 of the enterprise resources 128, user device 134 having enterprise resource 128, etc.) may include API protocols that are used to establish an API session between the ICS controller 104 and the external devices. In this regard, the API protocols and/or sessions may allow the ICS 100 to communicate content and data (e.g., associated with the institution's products and/or services) to be displayed directly within the external devices (e.g., CRM application(s) 129, ERP application(s) 130, user device 134, etc.). For example, the external device may activate an API protocol (e.g., via an API call), which may be communicated to the ICS controller 104 via the network 124 and the communications interface 120. The API gateway circuit 138 may receive the API call from the ICS controller 104, and the API gateway circuit 138 may process and respond to the API call by providing API response data. The API response data may be communicated to the external device via the ICS controller 104, communications interface 120 and the network 124. The external device may then access (e.g., display) the API response data (e.g., associated with the ICS 100 product and/or service) on the external device.

As such, the API gateway circuit 138 is structured to initiate, receive, process, and/or respond to API calls (e.g., via the ICS controller 104 and the communications interface 120) over the network 124. That is, the API gateway circuit 138 may be configured to facilitate the communication and exchange of content and data between the external devices (e.g., CRM applications 129, ERP applications 130, user device 134, etc.) and the ICS controller 104. Accordingly, to process various API calls, the API gateway circuit 138 may receive, process, and respond to API calls using other circuits, as discussed below. Additionally, the API gateway circuit 138 may be structured to receive communications (e.g., API calls, API response data, etc.) from other circuits. That is, other circuits may communicate content and data to the ICS controller 104 via the API gateway circuit 138. Therefore, the API gateway circuit 138 is communicatively coupled other circuits of the ICS controller 104, either tangibly via hardware, or indirectly via software.

Still referring to FIG. 1, the computing system 50 may further include a plurality of enterprise resources 128. The enterprise resources 128 may be or include various systems or applications which are provided to an enterprise (e.g., by one or more service providers of the enterprise resource(s) 128). The enterprise resources 128 may be configured to facilitate management of resources corresponding to various entities in various industries. The enterprise resources 128 is shown to include a plurality of customer relationship management (CRM) applications 129. The CRM applications 129 may be or include applications for establishing leads on new customers, assisting in converting a lead to a sale, planning delivery, and so forth. The enterprise resources 128 is shown to include a plurality of ERP applications 130. The ERP applications 130 may include human resources (HR) or payroll applications, marketing applications, customer service applications, operations/project/supply chain management applications, commerce design applications, accounting systems, treasury management platforms, and the like.

The enterprise resources 128 may be implemented on or otherwise hosted on a computing system, such as a discrete server, a group of two or more computing devices/servers, a distributed computing network, a cloud computing network, and/or another type of computing system capable of accessing and communicating using local and/or global networks (e.g., the network 124). Such computing system hosting the enterprise resources 128 may be maintained by a service provider corresponding to the enterprise resource(s) 128. The enterprise resources 128 may be accessible by various computing devices or user devices associated with an enterprise responsive to enrollment of the enterprise with the enterprise resources 128. The CRM applications 129 and/or the ERP applications 130 may include software and/or hardware capable of implementing a network-based or web-based applications (e.g., closed-source and/or open-source software like HTML, XML, WML, SGML, PUP, CGI, Dexterity, TypeScript, Node, etc.). Such software and/or hardware may be updated, revised, or otherwise maintained by resource or service providers of the enterprise resources 128. The CRM and ERP application(s) 129, 130 may be accessible by a representative(s) of a small or large business entity, any customer of the institution, and/or any registered (or unregistered) user of the products and/or service provided by one or more components of the computing system 50. As such, the enterprise resources 128 (including the CRM application(s) 129 and/or the ERP application(s) 130) may be or include a platform (or software suite) provided by one or more service providers which is accessible by an enterprise having an existing account with the ICS 100. In some instances, the enterprise resources 128 may be accessible by an enterprise which does not have an existing account with the ICS 100, but may open or otherwise establish an account with the ICS 100 using a CRM application 129 and/or an ERP application 130 of the enterprise resources 128, as described in greater detail below.

The enterprise resources 128 may be configured to establish connections with other systems in the computing system 50 (e.g., the ICS 100, the user device 134, etc.) via the network 124. Accordingly, the CRM application(s) 129 and/or ERP application(s) 130 of the enterprise resources 128 may be configured to transmit and/or receive content and data to and/or from the ICS controller 104 (e.g., via the communications interface 120) over the network 124. For example, and as described in greater detail below, an ERP application 130 (or CRM application 129) may activate an API protocol (e.g., via an API call) associated with the ICS 100 (e.g., to open an account, to request or apply for a loan instrument, to verify or determine an account balance, etc.). The API call may be communicated to the ICS controller 104 via the network 124 and the communications interface 120. The ICS controller 104 (e.g., the API gateway circuit 138) may receive, process, and respond to the API call by providing API response data. The API response data may be communicated to the ERP application 130 (or CRM application 129) via the communications interface 120 and the network 124, and the ERP application 130 (or CRM application 129) may access (e.g., analyze, display, review, etc.) the content and data received from the ICS 100.

In an exemplary embodiment, the enterprise resources 128 may be configured to include an interface that displays the content and data communicated from the ICS controller 104. For example, the enterprise resources 128 may include a graphical user interface, a mobile user interface, or any other suitable interface that may display the content and data (e.g., associated with products and services of the ICS 100) to the enterprise resources 128. In this regard, enterprise resources 128, and entities associated with the enterprise resources 128 (e.g., customers, employees, shareholders, policy holders, etc.), may access, view, analyze, etc. the content and data transmitted by the ICS controller 104 remotely using the enterprise resources 128.

Still referring to FIG. 1, the computing system 50 may further include a user device 134 associated e.g., owned by, used by, etc. with a user 132. The user device 134 may be or include a mobile phone, a tablet, a laptop, a desktop computer, an IoT-enabled device (e.g., an IoT-enabled smart car), a wearable device, a virtual/augmented reality (VR/AR) device, and/or other suitable user computing devices capable of accessing and communicating using local and/or global networks (e.g., the network 124). Wearable computing devices may refer to types of devices that an individual wears, including, but not limited to, a watch (e.g., a smart watch), glasses (e.g., eye glasses, sunglasses, smart glasses, etc.), bracelet (e.g., a smart bracelet), etc. In an exemplary embodiment, the user 132 may be a customer or client of the ICS 100 associated with the ICS controller 104 (e.g., a user having access to one or more accounts of another entity, such as a business or enterprise, another individual, etc.).

The user device 134 may be configured to establish connections with other systems in the computing system 50 (e.g., ICS 100, enterprise resources 128, etc.) via the network 124. Accordingly, the user device 134 may be able to transmit and/or receive content and data to and/or from the ICS controller 104 (e.g., via the communications interface 120) over the network 124. In some embodiments, the user device 134 may be able to transmit and/or receive content and data to and/or from the enterprise resources 128 over the network 124. In an exemplary embodiment, the user device 134 may include software and/or hardware capable of accessing a network-based or web-based application. For example, in some instances, the user device 134 may include an application that includes (closed-source and/or open-source) software such as HTML, XML, WML, SGML, PUP (Hypertext Preprocessor), CGI, Dexterity, TypeScript, Node, etc.

As shown in FIG. 1, the user device 134 is also shown to access an enterprise resource 128, which may be or include one or more of the enterprise resources 128 described above (e.g., a CRM application 129, an ERP application 130). For example, a user of the enterprise resource 128 may provide log-in credentials associated with an enterprise, to access the corresponding enterprise resource 128. In some embodiments, the enterprise resource 128 may be a standalone application. In some embodiments, the enterprise resource 128 may be incorporated into one or more existing applications of the user device 134. The enterprise resource 128 may be downloaded by the user device 134 prior to its usage, hard coded in the user device 134, and/or be a network-based or web-based interface application. In this regard, the ICS controller 104 may provide content and data (e.g., relating to the ICS 100 products or services) to the enterprise resource 128 via the network 124, for displaying at the user device 134. The enterprise resource 128 may receive the content and data (e.g., directly from the ICS controller 104, or indirectly from the ICS controller 104), and the user device 134 may process and display the content and data remotely to the user through the enterprise resource 128 displayed at the user device 134.

In some embodiments, the user device 134 may prompt the user 132 to log onto or access a web-based interface before using the enterprise resource 128. Further, prior to use of the enterprise resource 128, and/or at various points throughout the use of the enterprise resource 128, the user device 134 may prompt the user 132 to provide various authentication information or log-in credentials (e.g., password, a personal identification number (PIN), a fingerprint scan, a retinal scan, a voice sample, a face scan, any other type of biometric security scan) to ensure that the user 132 associated with the user device 134 is authorized to use the enterprise resource 128 and/or access the data from the ICS corresponding to the enterprise.

In an exemplary embodiment, the enterprise resource 128 is structured to provide displays on the user device 134, which provide content and data corresponding to the enterprise resource 128 to the user 132. As described in greater detail below, the enterprise resource 128 may be configured to display, render, or otherwise provide data from the ICS 100 (such as enterprise account data 140) to the user 132 via the user device 134. As such, the user device 134 may permit the user 132 to access the content and data of the ICS 100 that is maintained and distributed by the ICS controller 104 using the enterprise resource 128 (e.g., via the communications interface 120 and the network 124).

In an exemplary embodiment, an enterprise resource 128 accessed via the user device 134 may be configured to transmit, send, receive, communicate, or otherwise exchange data with the ICS 100. For example, an ERP application 130 (e.g., or CRM application 129) may have an option for viewing account information relating to accounts with the ICS 100. The user 132 of the user device 134 (e.g., a registered user having an account with the institution corresponding to the ICS 100) may select the option on the ERP application 130 to view the account information of the user 132 within the ERP application 130. The ERP application 130 may activate an API protocol (e.g., via an API call) to request the information from the ICS controller 104 corresponding to the account information. The ERP application 130 may communicate the API call to the ICS controller 104 via the network 124 and the communications interface 120. The ICS controller 104 (e.g., the API gateway circuit 138) may receive, process, and respond to the API call to provide API response data. For example, responsive to the ERP application 130 (or ICS controller 104) authenticating the user 132 as described above, the ERP application 130 may transmit data corresponding to the user (e.g., a user identifier) with the API call to the ICS controller 104. The ICS controller 104 may perform a look-up function in an accounts database using the user identifier from the API call to generate the API response data including the enterprise account data 140. The API response data may be communicated to the ERP application 130 via the communications interface and the network 124. In some embodiments, the ERP application 130 may display the response data to the user 132 (e.g., via the ERP application(s) 130), such as the enterprise account data 140.

Similarly, the user device 134 may communicate with the ICS 100, via the network 124, requesting enterprise resource 128 data (e.g., data from a CRM application 129, data from an ERP application 130, etc.) to view on a page associated with the ICS 100. For example, the user device 134 may display a page or user interface corresponding to the ICS 100 which includes an option for viewing analytics on conversion of leads to sales from the CRM application 129. The user device 134 may receive a selection of the option, and initiate a request for the ICS 100 to request the customer information from the CRM application 129. The ICS 100 (e.g., the ICS controller 104 via the communications interface 120) may process the request from the user device 134 (e.g., as discussed above), and activate an API protocol (e.g., via an API call) associated with the request (i.e., and the CRM application 129, etc.). The API call may be communicated to the CRM application 129 via the network. The CRM application 129 may receive, process, and respond to the API call by providing API response data as described above. The API response data may be communicated to the ICS 100 (e.g., the ICS controller 104 via the network and the communications interface 120). In some embodiments, a webpage or website (or application) associated with the ICS 100 may display the CRM data received from the CRM application 129 along with ICS data (e.g., account data, balances, etc.).

Figure 2:
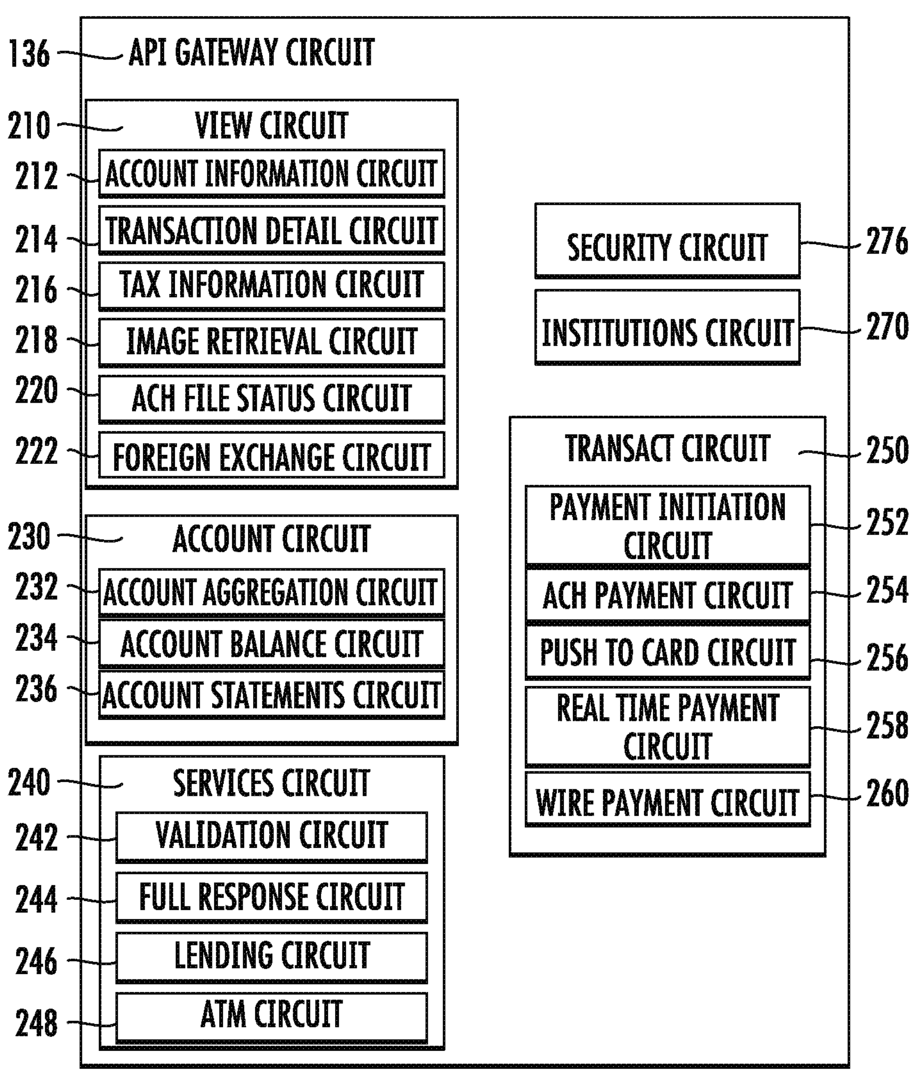
FIG. 2 is a schematic diagram of an application programming interface (API) gateway circuit of the computing system of FIG. 1, according to an exemplary embodiment.

Referring to FIG. 2, a schematic diagram of the API gateway circuit 138 of FIG. 1 is shown, according to an exemplary embodiment. As shown in FIG. 2, the API gateway circuit 138 may include a plurality of circuits. As some examples, the API gateway circuit 138 may include a view circuit 210, an account circuit 230, a services circuit 240, a transact circuit 250, an institutions circuit 270, and a security circuit 276. Each of the plurality of circuits (e.g., circuits 210-276) may also include a plurality of sub-circuits, as discussed below.

Referring generally to FIG. 2, in an exemplary embodiment the plurality of circuits (e.g., circuits 210-276) of the API gateway circuit 138 are structured to initiate, receive, process, and/or respond to API calls. As discussed briefly with regard to FIG. 1, the enterprise resources 128 may be configured to have API protocols which are used to establish sessions and facilitate communications (or exchange of data) between the ICS controller 104 and the enterprise resources 128. As such, the circuits (e.g., circuits 210-276) may receive an API call from the enterprise resources 128 (e.g., the ERP applications 130, CRM applications 129, etc.) via the network 124, the communications interface 120, and the API gateway circuit 138. The circuits (e.g., circuits 210-276) may then process the API call, and transmit content and data in response (e.g., API response data). The API response data may include information corresponding to the API call and associated with the corresponding circuit of the ICS 100. The data (e.g., API response data) may be transmitted back to the enterprise resources 128 through the communications interface 120, and the network 124. In this regard, the API protocols and sessions may allow the enterprise resources 128 and the user device 134 to request, transmit, receive, and/or display information relating to the content corresponding to the ICS 100 (e.g., via the ICS controller 104). Various examples of general functions which may be performed by each of the circuits 210-276 provided in the API gateway circuit 138 are described in greater detail below.

As shown in FIG. 2, the view circuit 210 may include a plurality of circuits that are generally structured to retrieve and provide information. The view circuit 210 may include an account information circuit 212, a transaction detail circuit 214, a tax information circuit 216, an image retrieval circuit 218, an automated clearing house (ACH) file status circuit 220, and a foreign exchange circuit 222. In an exemplary embodiment, the account information circuit 212 may be structured to retrieve and provide account balance and transaction data for checking and/or saving accounts. The transaction detail circuit 214 may be structured to retrieve and provide same day or previous day data (e.g., details, summaries, etc.) for one or more accounts. The transaction detail circuit 214 may also be structured to retrieve and provide specific transaction data (e.g., wire payments, ACH payments, checks, deposits, etc.). The tax information circuit 216 may be structured to retrieve and provide historic tax information (e.g., documents) of entities having an account with the ICS 100. In some embodiments, the tax information circuit 216 may be structured to retrieve and provide tax data from the ICS 100 with certain criteria (e.g., trust accounts, brokerage accounts, mortgages, student loans, etc.).

Referring still to the view circuit 210, in an exemplary embodiment, the image retrieval circuit 218 may be structured to retrieve and provide images of certain checks and/or deposit slips (e.g., paid, deposited, returned, etc.). In some embodiments, the image retrieval circuit 218 may be structured to provide data (e.g., research, reconciliation, collection, adjustments, etc.) relating to accounts maintained at the ICS 100. In other embodiments, the image retrieval circuit 218 may be structured to retrieve and provide data relating to checks (e.g., paid checks, deposited checks, returned checks, etc.) over a predetermined period for accounts maintained at the ICS 100. The ACH file status circuit 220 may be structured to retrieve and/or provide the status of ACH files and ACH batches originated through the ICS 100. The foreign exchange circuit 222 may be structured to retrieve and provide national and international exchange data (e.g., exchange rates) and certain ICS 100 account information (e.g., customer, supplier, payroll, marketplace, etc.).

As shown in FIG. 2, the account circuit 230 may also include a plurality of other circuits, which may be generally structured to retrieve and provide account specific information. For example, the account circuit 230 may include an account aggregation circuit 232, an account balance circuit 234, and an account statements circuit 236. In an exemplary embodiment, the account aggregation circuit 232 may be structured to retrieve and provide data relating to an ICS 100 account (e.g., checking, savings, credit, loan, investment, etc.). The account aggregation circuit 232 may also be structured to retrieve and provide historic and/or real-time account data (e.g., balances, transactions, holdings, etc.) of accounts maintained at the ICS 100.

Still referring to the account circuit 230, in an exemplary embodiment, the account balance circuit 234 may be structured to retrieve and provide balance information for national and/or international commercial accounts (e.g., checking, savings, general ledger, etc.). The account balance circuit 234 may also be structured to retrieve and provide additional balance information (e.g., opening balance, current available balance, closing ledger, etc.). The account statements circuit 236 may be structured to retrieve and provide certain ICS 100 account statements (e.g., accounts with certain credit cards, trust accounts, lines of credit, etc.) based on an input.

As shown in FIG. 2, the services circuit 240 may also include a plurality of other circuits that are generally configured to process and provide information. The services circuit 240 may include a validation circuit 242, a full response circuit 244, a lending circuit 246, and an automated teller machine (ATM) circuit 248. In an exemplary embodiment, the validation circuit 242 may be structured to process and provide status and ownership information for certain accounts maintained at the ICS 100. In some embodiments, the validation circuit 242 is structured to process certain new and/or existing ICS 100 accounts (e.g., enroll or establish new accounts, collect premiums on accounts, issue or collect taxes on accounts, etc.). The full response circuit 244 may be structured to provide detailed response information on ICS 100 accounts by processing the status and ownership information of certain ICS 100 accounts. In some embodiments, the full response circuit 244 may be structured to process the status and ownership information from the validation circuit 242.

Referring still to the services circuit 240, in an exemplary embodiment the lending circuit 246 may be structured to process a new or existing ICS 100 account (e.g., enroll new lending account, provide increased lending, etc.). Also, in an exemplary embodiment, the ATM circuit 248 may be structured to provide ICS 100 account information (e.g., checking, credit card, etc.) and/or process the ICS 100 account (e.g., process payment of an account balance).

As shown in FIG. 2, the transact circuit 250 may also include a plurality of circuits that are generally structured to initiate, process, and/or provide information relating to certain payments. The transact circuit 250 includes a payment initiation circuit 252, an automated clearing house (ACH) payment circuit 254, a push to card circuit 256, a real time payment circuit 258, and a wire payment circuit 260. In an exemplary embodiment, the payment initiation circuit 252 may be structured to initiate payment to certain ICS 100 national and international accounts. Similarly, the payment initiation circuit 252 may be structure to process and respond to API calls relating to the status of payments to certain ICS 100 national and international accounts. The ACH payment circuit 254 may be structured to initiate payment to other ICS 100 accounts (e.g., customer accounts, supplier accounts, payroll accounts, marketplace accounts, etc.). In some embodiments, the ACH payment circuit 254 may be structured to process the payment of claims to certain ICS 100 accounts (e.g., policyholders, insurance accounts, etc.).

Still referring to the transact circuit 250, in an exemplary embodiment, the push to card circuit 256 may be structured to initiate and/or process payment to certain ICS 100 accounts (e.g., consumer debit accounts, life insurance accounts, etc.). The real time payment circuit 258 may also be structured to initiate and/or process payment to certain ICS 100 accounts (e.g., policyholders, medical accounts, etc.) in real-time. Also in an exemplary embodiment, the wire payment circuit 260 may be structured to initiate and/or process wire payment to certain ICS 100 accounts. In some embodiments, the wire payment circuit 260 may also be structured to process and provide the status of the wire payment, or process and provide receipt of the wire payment.

As shown in FIG. 2, the API gateway circuit 138 includes an institutions circuit 270. The institutions circuit 270 may be structured to retrieve and provide information relating to ICS 100 institutions. For example, in an exemplary embodiment the institutions circuit 270 may be structured to provide information relating to a specific ICS 100 institution (e.g., geographic location, services offered, scheduling information, etc.). In some embodiments, the institutions circuit 270 may be structured to process an input (e.g., a current location, service preferences, dialect preference, etc.). In response, the institutions circuit 270 may be configured to provide information on fixed locations of facilities relating to the institution based on the input (e.g., closest facility to the user, services offered at the facility, directions to the facility, available appointments at the facility, etc.).

As shown in FIG. 2, the API gateway circuit 138 may also include a security circuit 276. The security circuit 276 may be structured to authenticate and/or validate a user accessing the ICS controller 104 (e.g., from the external devices or applications) to ensure sharing and permission preferences. The security circuit 276 may authenticate and/or validate a user via a variety of modalities input into the external devices or applications, for example a password, a fingerprint scan, a retinal scan, a voice sample, a face scan, and/or any other type of biometric security scan. The security circuit 276 may also be structured to process (e.g., verify) a supplemental authentication when applicable (e.g., a two-factor authentication (2FA) is presented on the enterprise resource(s) 128 and/or user device 134). The supplemental authentication may occur as part of a process to authorize an enterprise resource 128 (e.g., ERP application(s) 128, CRM application(s) 129, etc.) to access data or content (e.g., ICS data) from the ICS 100 (e.g., the ICS controller 104).

Figure 4:
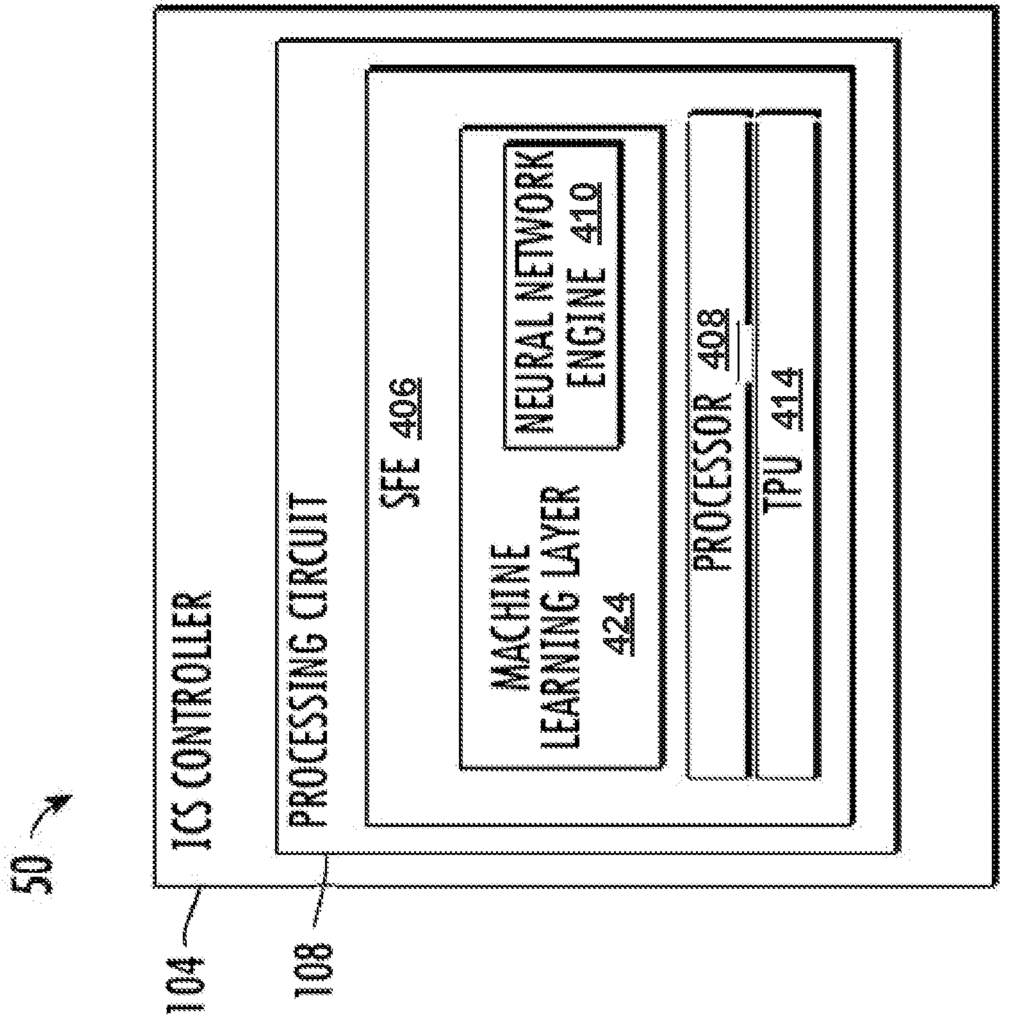
FIG. 4 is a schematic diagram of the processing circuit in the ICS controller of the computing system of FIG. 1 including a smart financial engine, according to an exemplary embodiment.

Referring to FIG. 1 and FIG. 4, in some embodiments, the ICS controller 104 may include a smart financial engine 406. Specifically, FIG. 4 shows a schematic diagram of the processing circuit 108 in the ICS controller 104, as part of computing system 50 may include a smart financial engine (SFE) 406 as shown, according to an exemplary embodiment. SFE is shown to include a machine learning layer 424, a processor 608, and a tensor processing unit (TPU) 414.

SFE 406 may be configured to receive enterprise resources 128 data, including data from CRM applications 129 and data from ERP applications 130. Data received by the SFE 406 may include, for example, accounts receivable data, accounts payable data, account balance data (derived from one or more enterprises), liquid asset data, illiquid asset data, 401K data, investment retirement account (IRA) data, property holding data, investment opportunities, collateral backing opportunities, refinance opportunities, user 132 feedback (e.g., whether a customer, customer relationship manager, or the like ranked (or scored) the recommendation as “positive” or “negative”, whether the customer, customer relationship manager, or the like ranked (or scored) the recommendation as aggressive, conservative or moderate), and the like.

The SFE 406 may access enterprise resources 128 using the API gateway circuit 138 described above with reference to FIG. 1. The SFE 406 may also access one or more databases using API gateway circuit 138. In some embodiments, the data received from databases may include trained machine learning models, thresholds, and the like. Alternatively or additionally, an enterprise may store trained machine learning models and/or threshold. Alternatively or additionally, the SFE 406 may store the trained machine learning models and/or thresholds. As such, the SFE 406 may include, maintain, or otherwise access the trained machine learning models described herein.

Figure 3:
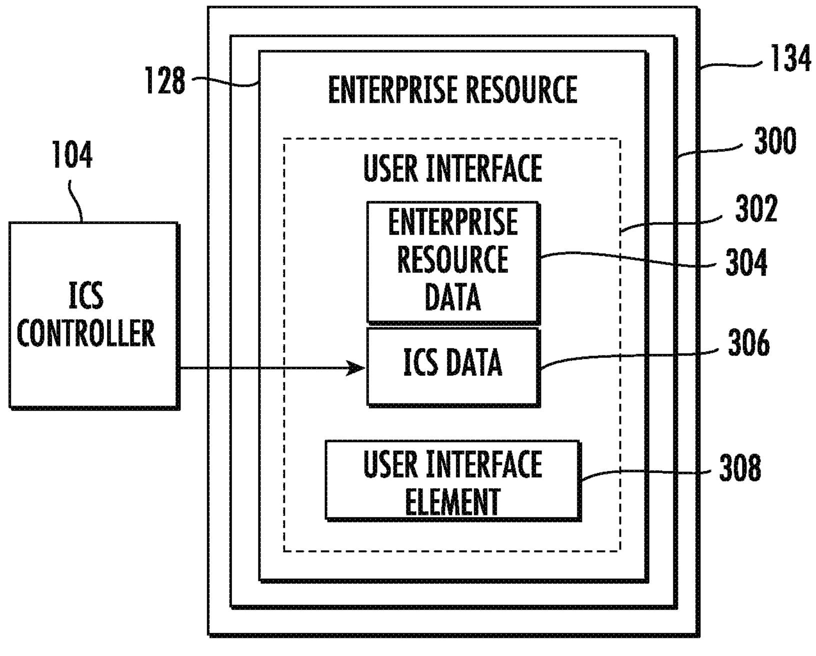
FIG. 3 is a diagram of a user device of FIG. 1 accessing an enterprise resource that displays institution computing system data, according to an exemplary embodiment.

In some embodiments, a user 132 may configure the SFE 406 by interacting with a user interface (e.g., user interface 302 in FIG. 3). For example, a user 132 may configure various thresholds or select machine learning models to be implemented via SFE 406. In some embodiments, the SFE 406 receives the user's 132 instructions and/or configurations using an API (e.g., via the API gateway circuit 138).

A processor 608 may be the logic in a device (e.g., SFE 406) that receives software instructions. A central processing unit (CPU) may be considered any logic circuit that responds to and processes instructions. CPUs are configured to execute various types of instructions. One or more algorithmic logic units (ALU) may be incorporated in processors to perform necessary calculations in the event an instruction requires a calculation be performed. When a CPU performs a calculation, it performs the calculation, stores the calculation in memory, and reads the next instruction to determine what to do with the calculation.

A different type of processor 608 utilized in SFE 406 may be the graphics processing unit (GPU). The SFE 406 may include both GPU and CPU processors 608. A GPU is a specialized electronic circuit designed to quickly perform calculations and access memory. As GPUs are specifically designed to perform calculations quickly, GPUs may have many ALUs allowing for parallel calculations. Parallel calculations mean that calculations are performed more quickly (e.g., in parallel to other tasks being performed by the processor 608). GPUs, while specialized, are still flexible in that they are able to support various applications and software instructions. As GPUs are still relatively flexible in the applications they service, GPUs are similar to CPUs in that GPUs perform calculations and subsequently store the calculations in memory as the next instruction is read.

In some embodiments, processor 608 may include a neural network engine 410. In other embodiments, the SFE 406 may access the neural network engine 410 using an API. That is, each machine learning model may have an associated API that may be used to call the machine learning model. Instructions for invoking various machine learning models in the machine learning layer 424 may be stored in memory 116. The various machine learning models may include neural networks (including convolutional neural networks, deep neural networks), Support Vector Machines (SVMs), Random Forests, and the like.

Employing APIs to invoke machine learning models allows the machine learning models to be implemented in different environments. For example, the machine learning models may be implemented in cloud or on-premise environments. In addition, machine learning models may be added over time (e.g., by a user 132 using a user interface 302).

Processor 608 may call machine learning models using the instructions stored in memory 116, access databases using the instructions stored in memory 116, and may receive information from a user interface 302 using the instructions stored in memory 116. The use of APIs facilitates the scalability of SFE 406.

A neural network engine 410 is an engine that utilizes the inherent parallelisms in a neural network to improve and speed up the time required for calculations. For example, generally, processors performing neural network instructions perform the neural network calculations sequentially because of the dependencies in a neural network. For example, the inputs to one neuron in a network may be the outputs from the previous neuron. In other words, a neuron in a first layer may receive inputs, perform calculations, and pass the output to the next neuron. However, many of the same computations are performed numerous times during the execution of the neural network. For example, multiplication, addition and executing activation functions are performed at every neuron. Further, while neurons within the same layer may be dependent on one another, neurons are independent from neurons in other layers. Thus, a neural network engine 410 may be used to capitalize on the parallelisms of a neural network. For example, every addition, multiplication and execution of the activation function may be performed simultaneously for different neurons in different layers.

In addition to CPUs and GPUs, SFE 406 may additionally have a tensor processing unit (TPU) 414. TPU 414, while still a processor like a CPU and GPU, is an Artificial Intelligence application-specific integrated circuit. TPUs may not require any memory, as their purpose is to perform computations quickly. Thus, TPU 414 performs calculations and subsequently passes the calculations to an ALU or outputs the calculations such that more calculations may be performed. Thus, TPUs may be faster than their counterparts CPUs and GPUs.

Section II: Machine Learning Model(s)

Figure 5:
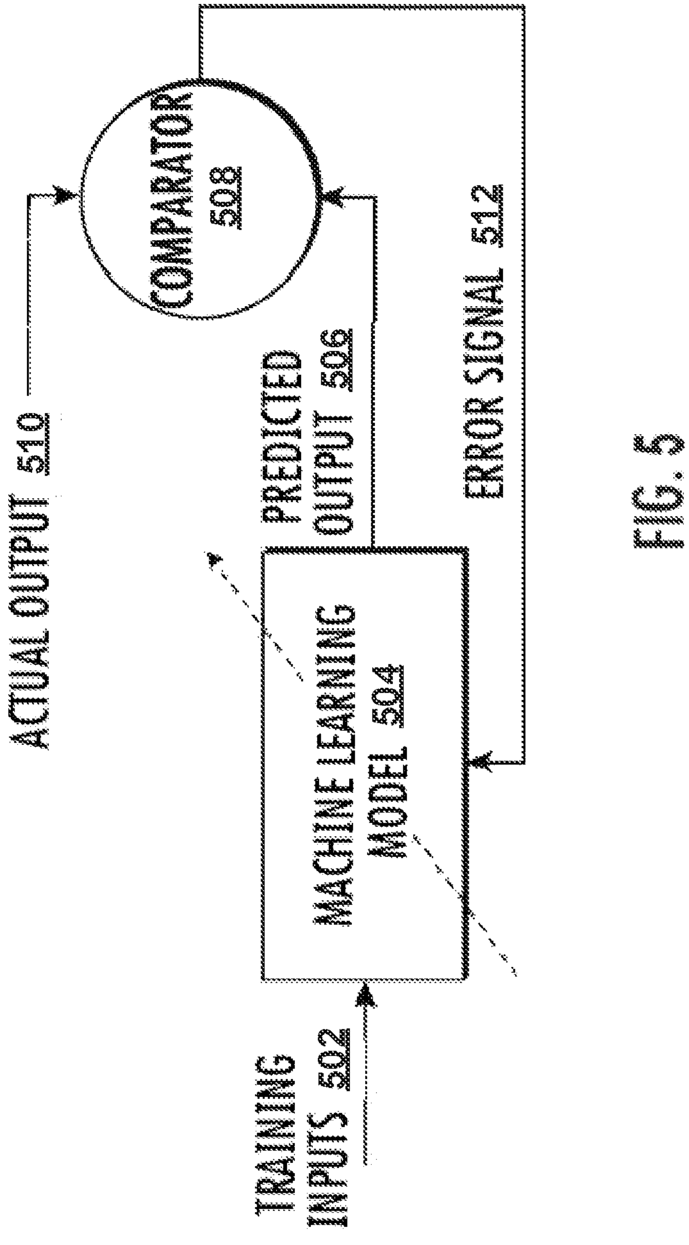
FIG. 5 is a block diagram of an example system using supervised learning, according to an exemplary embodiment.

Referring to FIG. 5, a block diagram of an example system using supervised learning, is shown. Supervised learning is a method of training a machine learning model given input-output pairs. An input-output pair is an input with an associated known output (e.g., an expected output).

Machine learning model 504 may be trained on known input-output pairs such that the machine learning model 504 can learn how to predict known outputs given known inputs. Once the machine learning model 504 has learned how to predict known input-output pairs, the machine learning model 504 can operate on unknown inputs to predict an output.

The machine learning model 504 may be trained based on general data and/or granular data (e.g., data based on a specific user 132) such that the machine learning model 504 may be trained specific to a particular user 132.

Training inputs 502 and actual outputs 510 may be provided to the machine learning model 504. Training inputs 502 may include ERP Data (e.g., invoices, accounts receivable data, accounts payable data, account balance data, liquid asset data, illiquid asset data, 401k data, IRA data, etc.). Actual outputs 510 may include one or more datasets. For example, the actual outputs 510 may include one or more datasets required to onboard a new account. For example, the training inputs 502 may include one or more documents from a training document database and the actual outputs 510 may include a dataset including data entries from the training document database, wherein the dataset includes at least a subset of the data entries needed to onboard a new account.

The inputs 502 and actual outputs 510 may be received from historic enterprise resource 128 data from any of the data repositories. For example, a data repository (e.g., the document database 918 discussed further herein) of an enterprise resource 128 may contain an account balance of a user 132 a year ago. The data repository may also contain data associated with the same account six months ago and/or data associated with the same account currently. Thus, the machine learning model 504 may be trained to extract required data entries from historic enterprise resource 128 data.

The SFE 406 may include one or more machine learning models 504. In an embodiment, a first machine learning model 504 may be trained to determine which documents in a document database include required data entries for onboarding a new account based on current user 132 enterprise resource 128 data. For example, the first machine learning model 504 may use the training inputs 502 (e.g., accounts receivable data, accounts payable data, account balance data, liquid asset data, illiquid asset data, 401k data, IRA data, and the like) to predict outputs 506 (e.g., one or more datasets required to onboard a new account), by applying the current state of the first machine learning model 504 to the training inputs 502. Further, machine learning outputs 506 may include a list of documents that contain at least some of the required data entries. As is discussed further herein, the machine learning model 504 may be trained to reduce the amount of unnecessary documents generated as outputs 506 to be shared during the onboarding process.

The comparator 508 may compare the predicted outputs 506 to actual outputs 510 (e.g., actual datasets required to onboard a new account, actual documents required to onboard a new account, etc.) to determine an amount of error or differences. For example, the predicted dataset (e.g., predicted output 506) may be compared to the actual dataset used to onboard the new account (e.g., actual output 510).

Training the machine learning model 504 with the data from the enterprise resources 128 allows the machine learning model 504 to learn, and benefit from, the interplay between the current and future states of the user/entity and enterprise resource 128 data. For example, training the machine learning model to predict a required dataset to onboard a new account may accelerate the onboarding process by reducing the amount of information that needs to be pushed to the manager of the new account to open the new account. Generally, machine learning models are configured to learn the dependencies between various inputs. Accordingly, the machine learning model 504 learns the dependencies between the enterprise resource data and other data/factors of the user, resulting in improved predictions over predictions that are determined individually and/or independently.

During training, the error (represented by error signal 512) determined by the comparator 508 may be used to adjust the weights in the machine learning model 504 such that the machine learning model 504 changes (or learns) over time. The machine learning model 504 may be trained using a backpropagation algorithm, for instance. The backpropagation algorithm operates by propagating the error signal 512. The error signal 512 may be calculated each iteration (e.g., each pair of training inputs 502 and associated actual outputs 510), batch and/or epoch, and propagated through the algorithmic weights in the machine learning model 504 such that the algorithmic weights adapt based on the amount of error. The error is minimized using a loss function. Non-limiting examples of loss functions may include the square error function, the root mean square error function, and/or the cross entropy error function.

The weighting coefficients of the machine learning model 504 may be tuned to reduce the amount of error, thereby minimizing the differences between (or otherwise converging) the predicted output 506 and the actual output 510. The machine learning model 504 may be trained until the error determined at the comparator 508 is within a certain threshold (or a threshold number of batches, epochs, or iterations have been reached). The trained machine learning model 504 and associated weighting coefficients may subsequently be stored in memory 116 or other data repository (e.g., a database) such that the machine learning model 504 may be employed on unknown data (e.g., not training inputs 502). Once trained and validated, the machine learning model 504 may be employed during a testing (or an inference phase). During testing, the machine learning model 504 may ingest unknown document databases to predict required data sets.

Using the systems and methods described herein, the SFE 406 can have a formalized approach to onboarding a new account using a single automated framework based on current enterprise resource 128 data.

Figure 6:
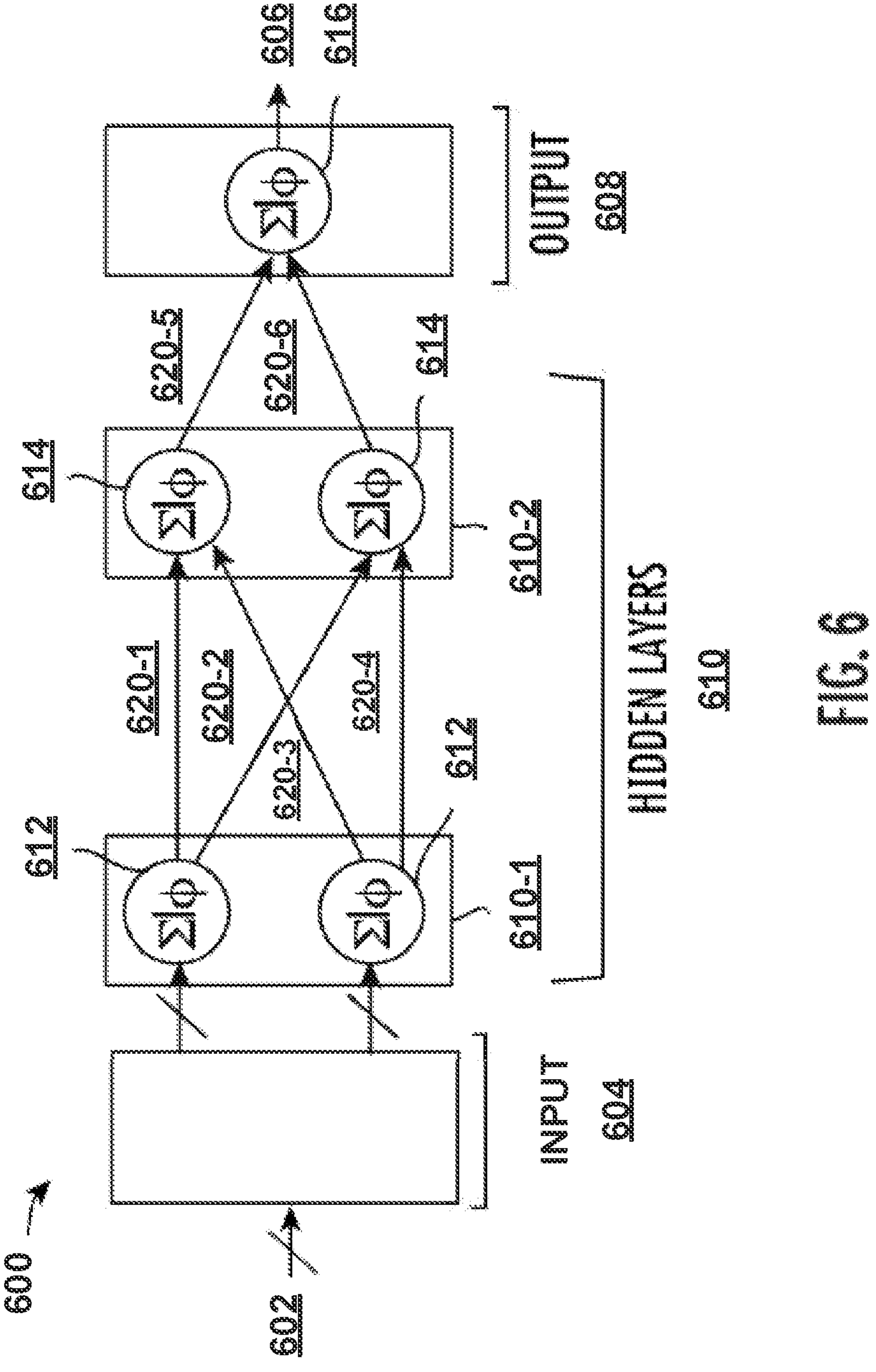
FIG. 6 is a block diagram of a simplified neural network model, according to an exemplary embodiment.

Referring to FIG. 6, a block diagram of a simplified neural network model 600 is shown. The neural network model 600 may include a stack of distinct layers (vertically oriented) that transform a variable number of inputs 602 being ingested by an input layer 604, into an output 606 at the output layer 608.

The neural network model 600 may include a number of hidden layers 610 between the input layer 604 and output layer 608. Each hidden layer has a respective number of nodes (612, 614 and 616). In the neural network model 600, the first hidden layer 610-1 has nodes 612, and the second hidden layer 610-2 has nodes 614. The nodes 612 and 614 perform a particular computation and are interconnected to the nodes of adjacent layers (e.g., nodes 612 in the first hidden layer 610-1 are connected to nodes 614 in a second hidden layer 610-2, and nodes 614 in the second hidden layer 610-2 are connected to nodes 616 in the output layer 608). Each of the nodes (612, 614 and 616) sum up the values from adjacent nodes and apply an activation function, allowing the neural network model 600 to detect nonlinear patterns in the inputs 602. Each of the nodes (612, 614 and 616) are interconnected by weights 620-1, 620-2, 620-3, 620-4, 620-5, 620-6 (collectively referred to as weights 620). Weights 620 are tuned during training to adjust the strength of the node. The adjustment of the strength of the node facilitates the neural network's ability to predict an accurate output 606.

In some embodiments, the output 606 may be one or more numbers. For example, output 606 may be a vector of real numbers subsequently classified by any classifier. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As, such the softmax classifier may be employed because of the classifier's ability to classify various classes. Other classifiers may be used to make other classifications. For example, the sigmoid function, makes binary determinations about the classification of one class (i.e., the output may be classified using label A or the output may not be classified using label A).

Figure 7:
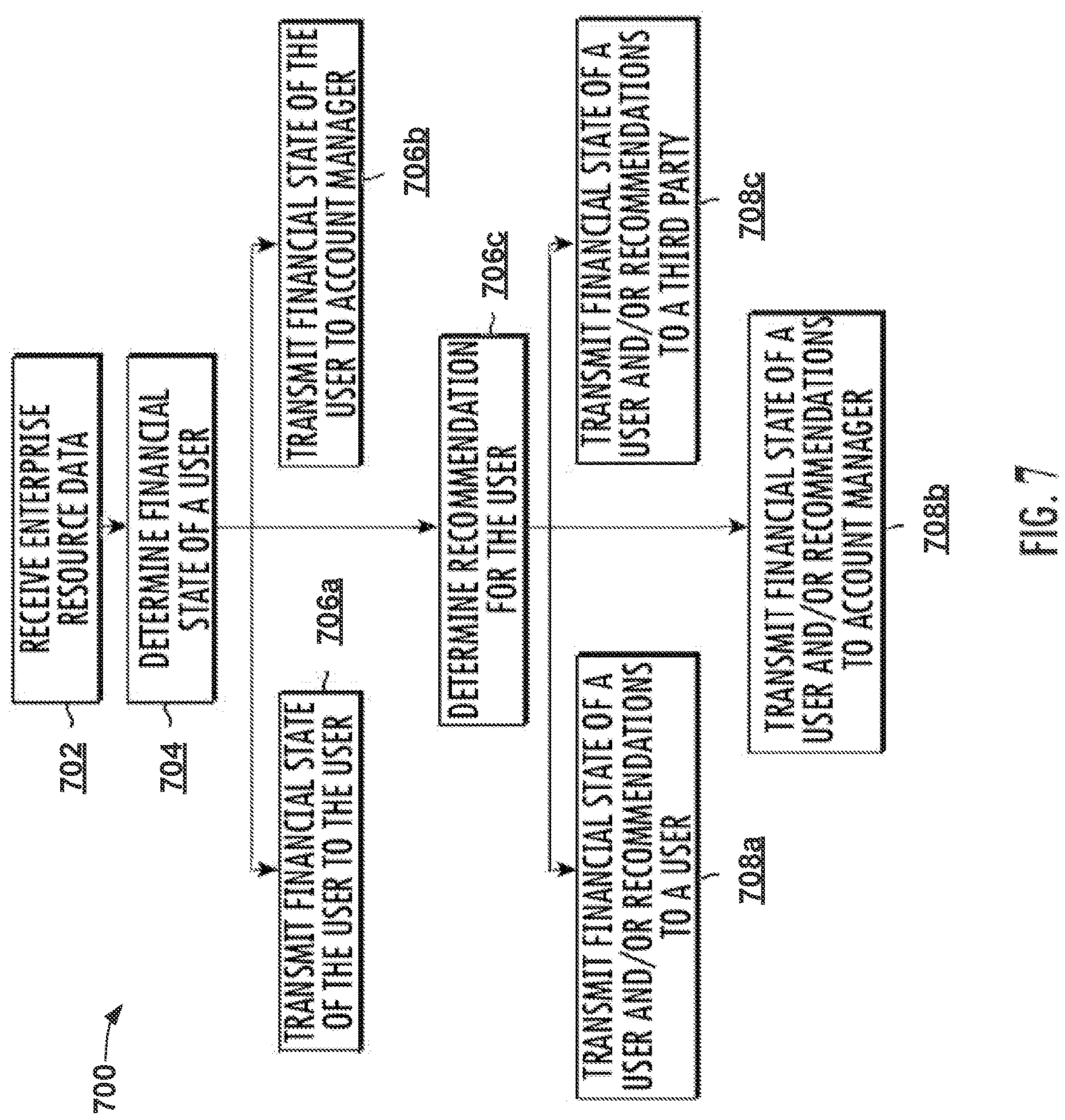
FIG. 7 is a flowchart of a process for providing real-time (or near real time) predictions to a user using the smart financial engine of FIG. 4, according to an exemplary embodiment.
Figure 8:
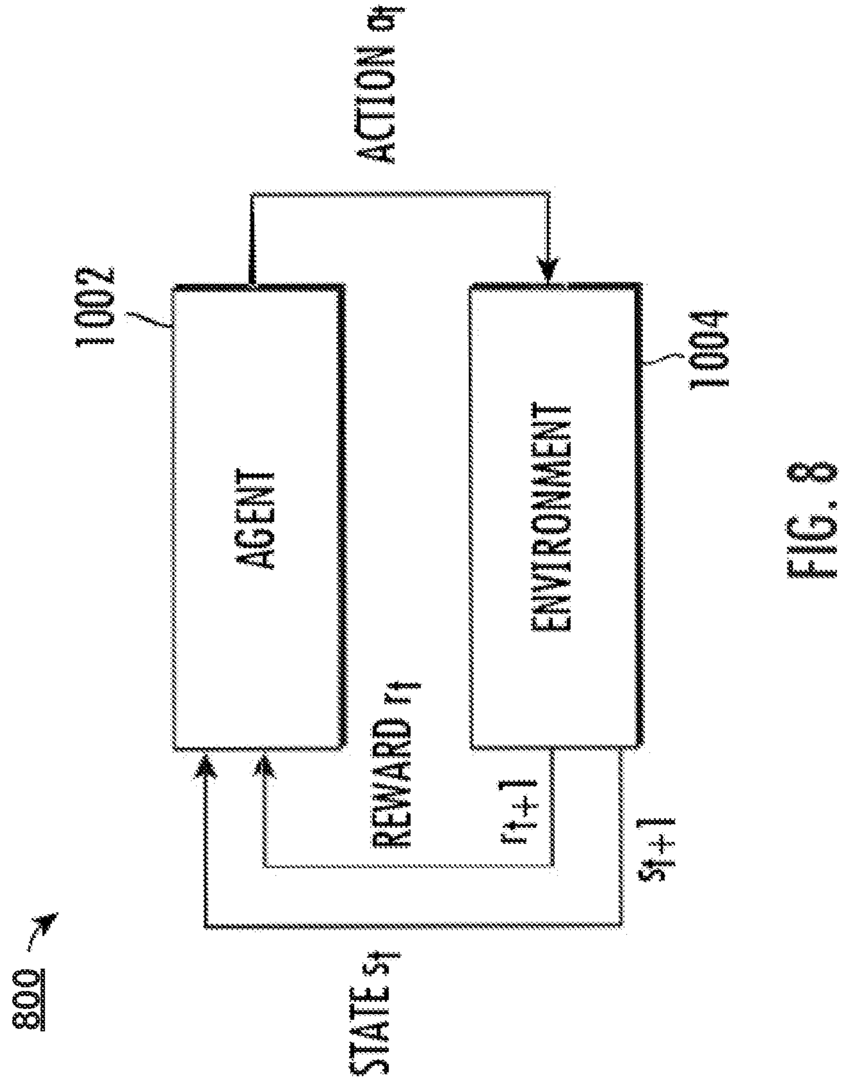
FIG. 8 is a block diagram of an example system using reinforcement learning, according to an exemplary embodiment.

Referring now to FIG. 7, a flow chart of a process 700 for providing real-time (or near real-time) SFE 406 predictions to a user is shown, according to an exemplary embodiment. The process 700 may include steps 702-708. However, other embodiments may include additional or alternative steps, or may omit one or more steps altogether. The process 700 is described as being executed using the computing system 50 of FIG. 1, and in particular the SFE of FIG. 4 such that reference is made to the components described above to aid in the description of process 700. However, one or more steps of process 700 may be executed by any number of computing systems. For example, one or more computing systems may locally perform part or all of the steps described in FIG. 7.

At step 702, the ICS 100 receives enterprise resource 128 data. The enterprise resource 128 data may include, for example, data which is maintained by the ICS 100 for an enterprise (i.e., enterprise account data 140 for instance), data which is maintained by an enterprise on enterprise computing devices and/or data which is maintained by a third party on behalf of an enterprise. The enterprise resource 128 data may include, for example, data which is provided to a customer relationship management (CRM) application 129, data which is provided to an enterprise resource planning (ERP) application 130, data which is provided during account setup at a financial institution, data which is maintained by third parties (i.e., publicly known information), etc. In some embodiments, the ICS controller 104 may receive enterprise resource 128 data via the communications interface 120 by CRM Application(s) 129, ERP Application(s) 130, and the like. Alternatively or additionally, the ICS controller 104 may receive enterprise resource 128 data via the communications interface 120 by a user device 134. For example, a user 132 may manually enter enterprise resource 128 data (e.g., 401k information) into a user device 134 which transmits the enterprise resource 128 data to the ICS controller 104 via the communications interface 120. The data received by the ICS controller 104 may be ingested by the SFE 406 and in particular, by a trained machine learning model 504.

In some embodiments, the ICS controller 104 may receive enterprise resource 128 data based on one or more user 132 inputs via a user device 134. For example, a user 132 may manually trigger SFE 406 using drop-downs buttons, highlighted rows, voice commands, etc.

In other embodiments, the ICS controller 104 may receive enterprise resource 128 data based on predetermined configurations. The predetermined configurations may include temporal triggers. For example, the ICS controller 104 may periodically (e.g., annually, every six months, quarterly, monthly, bi-weekly, weekly, daily, etc.) query one or more CRM Application(s) 129, ERP Application(s) 130, and the like (i.e., via API calls to corresponding APIs for the CRM application(s) and or ERP applications 129, 130) for enterprise resource 128 data.

In yet other embodiments, the ICS controller 104 may receive enterprise resource 128 data based on triggering conditions. A triggering condition may include monitoring enterprise resource 128 data obtained from CRM application(s) 129 and/or ERP application(s) 130, and determining that one or more thresholds have been satisfied. For example, the ICS controller 104 may monitor accounts payable data obtained from CRM application(s) 129 and/or ERP application(s) 130. Every time a predetermined number of accounts (such as one new account, two new accounts, etc.) are added as an account payable, the ICS controller 104 may be triggered to query CRM Application(s) 129, ERP Application(s) 130, and the like for enterprise resource 128 data.

Alternatively or additionally, the ICS controller 104 may be triggered to query CRM Application(s) 129, ERP Application(s) 130, and the like for enterprise resource 128 data in response to determining that a withdrawal (or deposit) satisfies a threshold. For example, transactions exceeding a threshold (determined by, for example, comparing an account balance at a first point in time and an account balance at a second point in time) may be a triggering condition.

It should also be appreciated that step 702 may be presupposed by an authentication of a user/user device-session in order to gain access the CRM application(s) 129, ERP application(s) 130 and/or the ICS 100. The authentication may be completed via the security circuit 276 of the ICS 100 prior to accessing or requesting any data via the ICS 100 via an API call (e.g., prior to the step 702). Any authentication may also be completed via a password, biometric scan, voice command, etc., as described above with regard to FIG. 2.

At step 704, the ICS controller 104 may determine a user's 132 financial state. The user's financial state may be a state of the user's 132 financial accounts. For example, the financial state of the user 132 may be a current or future state of the user's 132 accounts receivable data, accounts payable data, account balance data, liquid asset data, illiquid asset data, 401k data, IRA data, property holdings, and the like.

The user's 132 financial state may be determined by employing one or more trained machine learning models 504. For example, the trained machine learning model 504 may receive enterprise resource 128 data (e.g., accounts receivable data, accounts payable data, account balance data (derived from one or more enterprises), liquid asset data, illiquid asset data, 401K data, IRA data, property holding data, and the like) and determine a future financial state of the user's accounts receivable data, accounts payable data, account balance data, liquid asset data, illiquid asset data, 401k data, IRA data, and the like. The extent of the prediction of the financial state may depend on how the machine learning model 504 was trained (e.g., trained to predict a financial state six months into the future, trained to predict one year into the future, etc.).

In some embodiments, the dimensionality of the received enterprise resource 128 data may be reduced such that only statistically significant data (or other data determined to be relevant) is applied to the machine leaning model 504. For example, the SFE may reduce the dimensionality of the data received by the SFE 406 using clustering, support vector machines, decision trees, filtering, and the like. For example, statistically insignificant data (e.g., noise) may be removed using a Kalman filter, a Z-test, a T-test, or other machine learning model.

The ICS controller 104 may proceed to step **706*a*, 706*b*, 706*c*** or some combination.

At step **706*a*, the ICS controller 104 may transmit the user's 132 financial state to the user 132. In some embodiments, the ICS controller 104 may transmit the information via a notification. The notification may include the predicted future financial state of the user's 132 accounts receivable data, accounts payable data, account balance data, liquid asset data, illiquid asset data, 401k data, IRA data, and the like. The notification may also categorize the predicted future financial state of the user 132**.

In some embodiments, the SFE 406 may categorize the predicted financial state of the user 132 into negative and positive predicted financial states. For example, a negative financial state may be a in which the user 132 does not have enough money to pay various accounts payable at the end of a month. A positive financial state may be a state in which the user 132 has a surplus of money. In a different example, a positive financial state may be a state in which the user 132 has enough money available in one or more accounts to make the necessary monthly payments.

The SFE 406 may determine whether the financial state of the user is a negative financial state based on statistically or algorithmically combining (or comparing) one or more predicted outputs from the machine learning model 504. For example, the SFE 406 may compare the predicted accounts receivable data with the predicted account balance and predicted accounts payable data. If the predicted accounts payable value is greater than an aggregated predicated account balance and predicted accounts receivable value, then the SFE 406 may determine that the user is in a negative financial state.

In contrast, if the aggregated predicted account balance and predicted accounts receivable value is greater than the predicted accounts payable value (by a predetermined percentage amount, for example), then the SFE 406 may determine that the user 132 is not in a negative financial state. For instance, if the aggregated (e.g., sum) predicted account balance and predicted accounts receivable value is 10% greater than the predicted accounts payable value, then the SFE 406 may determine that the user 132 is not in a negative financial state. In some embodiments, if the SFE 406 determines that the user 132 is not in a negative financial state, then the SFE 406 may determine that the user 132 is in a positive financial state.

In other embodiments, the SFE 406 may employ one or more thresholds (statically or dynamically determined) to evaluate whether the user 132 is in a positive financial state. For example, if the aggregated predicted account balance and predicted accounts receivable value is 10% greater than the predicted accounts payable value, then the SFE 406 may determine that the user is not in a negative financial state, and if aggregated predicted account balance and predicted accounts receivable value is 30% greater than the predicted accounts payable value, then the SFE 406 may determine that the user is in a positive financial state.

At step 706*b*, the ICS controller 104 may transmit the user's 132 financial state to an account manager (i.e., rather than the user). For example, the ICS controller 104 may transmit the user's financial state to a customer relationship manager which is assigned (i.e., in the CRM application 129) to the user or entity. The customer relationship manager may be an account manager at the institution corresponding to the ICS controller 104. The customer relationship manager may use the financial state for updating a financial plan for the user, for determining one or more recommendations for the customer, etc. In some embodiments, the ICS controller 104 may transmit the information via a notification. The notification may include the future financial state of the user's 132 accounts receivable data, accounts payable data, account balance data, liquid asset data, illiquid asset data, 401k data, IRA data, and the like. The notification may also categorize the future financial state of the user 132 into positive and/or negative financial states, as discussed herein.

At step 706*c*, the ICS controller 104 may determine a recommendation for the user 132. That is, the financial state information may be fed into one or more downstream applications. More specifically, the SFE 406 may determine a recommendation for the user 132 using a machine learning model 504 trained to receive financial state information such as enterprise resource 128 data including accounts receivable data, accounts payable data, account balance data, liquid asset data, illiquid asset data, 401k data, IRA data, property holdings, and the like and predict recommendations (e.g., opening an account, transferring holdings between accounts to optimize savings, investing money in stocks, investing money in bonds, investing money with various companies, taking out a loan, identifying property as collateral, identifying future accounts receivable as collateral, refinancing a loan, and the like).

Alternatively or additionally, the machine learning model 504 may be trained to receive predicted financial state information such as future accounts receivable data, future accounts payable data, future account balance data, future liquid asset data, future illiquid asset data, future 401k data, future IRA data, future property holdings, and the like and predict recommendations (e.g., investing money in stocks, investing money in bonds, investing money with various companies, identifying property as collateral, identifying future accounts receivable as collateral, refinancing a loan, and the like).

The output of the machine learning model 504 may include probabilities of various recommendations. The SFE 406 may determine a recommendation based on the recommendation with the maximum probability. The recommendation may indicate a recommendation with the highest probability that a customer relationship manager would recommend, and/or a recommendation that results in the highest probability of a favorable outcome. For example, a favorable outcome may be an outcome that includes the user's 132 account balance and accounts receivable value being greater than the user's 132 accounts payable value. Recommendations may be based on historic recommendations and include recommending the user 132 to invest their money in stocks, invest their money in bonds, invest their money with various companies, identify property as collateral, identify future accounts receivable as collateral, refinance the loan, and the like.

Alternatively or additionally, in response to a user 132 input, SFE 406 may determine a particularly classified recommendation. Recommendations may be classified into various groups, where groups of recommendations may include aggressive recommendations, conservative recommendations, or moderate recommendations. The recommendations may be classified and/or grouped based on information received from customer and/or customer relationship managers feedback. The SFE 406 may employ clustering (such as k-means clustering or other suitable unsupervised learning methods) to determine the recommendations in the groups of recommendations.

In k-means clustering, for example, groups of recommendations may be clustered by randomly generating a centroid and associating a group of recommendations (e.g., aggressive recommendations, conservative recommendations, or moderate recommendations) with the centroid. Recommendations may be clustered based on relative distances between the recommendations and the centroids. The centroids may be moved to new relative locations based on minimizing the average distance of each of the recommendations associated with the centroid. Each time the centroid moves, the distance between the recommendations and the centroid may be recalculated. The clustering process may iterate until a stopping criteria is met (e.g., recommendations do not change clusters, the sum of the distances is minimized, a maximum number of iterations is reached). In some embodiments, distances may be measured between the recommendations and centroids using Euclidean distance. In other embodiments, the distance between the recommendations and the centroids may be measured based on correlation features of the recommendations.

Alternatively or additionally, each recommendation may be treated as a centroid. The recommendations may be clustered based on the distances of the centroid recommendations to the other recommendations. Distance measure may include, for example, the smallest maximum distance to other recommendations, the smallest average distance to other recommendations, and the smallest sum of squares of distances to other recommendations.

In an example, a user 132 may use the user device 134 to select (e.g., via drop-down menus, scroll wheels, etc.) an aggressive recommendation. Accordingly, the SFE 406 may determine a recommendation from the group of aggressive recommendations with the maximum probability responsive to the user 132 selecting their preferred level of aggressiveness for a recommendation Referring back to FIG. 7, in some embodiments, other probabilistic analyses may be performed to determine one or more recommendations based on present or future financial state information. For example, a Monte Carlo simulation may be used to generate a probability distribution for each recommendation. Various recommendations may be mathematically represented using functions. For example, a recommendation function may include various quadratic terms representing considerations determined by a customer relationship manager or other specialist when providing recommendations to users 132 based on the user's 132 financial state.

One or more variables in a function may be assigned as a random variable such that each time an iteration is performed, a value will be selected for the random variable from a normal distribution, uniform distribution, lognormal distribution, and the like depending on the variable. For example, some variables may have values selected from a normal distribution of values, while other variables have values selected from a normal distribution of values.

The SFE 406 may determine a recommendation based on a maximum probability of each of the maximum probabilities of the Monte Carlo recommendation simulations. Alternatively or additionally, the SFE 406 may determine a maximum recommendation based on a group of recommendations, where the group of recommendations may include groups of aggressive recommendations, conservative recommendations, or moderate recommendations.

Referring back to FIG. 7, the ICS controller 104 may proceed to step 708*a*, 708*b*, 708*c* or some combination.

At step 708*a*, the ICS controller 104 may transmit the user's 132 financial state and the recommendations to the user 132. In some embodiments, the ICS controller 104 may transmit the information via a notification. The notification may include the future financial state of the user 132 (e.g., 132 accounts receivable data, accounts payable data, account balance data, liquid asset data, illiquid asset data, 401k data, IRA data, and the like) and the recommendation based on predicted data of a financial state of the user 132.

For example, the SFE 406 may determine in the future that the user 132 will not have enough liquid assets to pay their bills. Based on the future prediction of the financial state of the user 132 (e.g., not having enough liquid assets to pay their bills), the SFE 406 may recommend taking out a loan and using particular property as collateral backing. Accordingly, the user 132 may avoid the predicted future financial state (e.g., not having enough liquid assets to pay their bills) by presently taking out a loan and using the particular property as collateral backing.

At step 708*b*, the ICS controller 104 may transmit the user's 132 financial state and/or the recommendations to an account manager. Step 708*b* may be similar in some regards to step 706*b*. For example, the ICS controller 104 may transmit the recommendation to an account manager which is assigned to the user. The account manager may be a dedicated team member assigned to the accounts of the user. The account manager may be a general analyst who is receives the recommendation. In these and other embodiments, the account manager may provide the recommendation to the customer. The account manager may provide the recommendation generated by the ICS controller 104 accompanied with other recommendations (i.e., generated by the account manager and/or third parties). In some embodiments, the ICS controller 104 may transmit the information via a notification. The notification may include the future financial state of the user 132 (e.g., 132 accounts receivable data, accounts payable data, account balance data, liquid asset data, illiquid asset data, 401k data, IRA data, and the like) and the recommendation based on predicted data of a financial state of the user 132.

At step 708*c*, the ICS controller 104 may transmit the user's 132 financial state and/or the recommendations to a third party. The third party may be an underwriter associated with a loan which was applied for by the user (or an entity associated with the user). For example, the underwriter may be tasked with underwriting (or evaluating a likelihood of success) associated with the loan applied for by the user/entity. The ICS controller 104 may be configured to transmit the user's financial state and/or recommendations to a device or portal associated with the underwriter. The underwriter may user the financial state and/or recommendations for approving/denying a loan application, or otherwise receiving more information relating to an applicant. While traditionally underwriters do not have ERP/CRM data available to them, the systems and methods described herein leverage such data to provide recommendations and predicted future financial states, which may be used for loan underwriting decisions.

Section III: Digital Onboarding Using ERP Data

Generating a new account with an institution (such as a financial institution) for a user of enterprise resource planning (ERP) software may be complicated, require significant manual intervention, be poorly organized, and/or may result in a user sharing unneeded data. Further, the ERP software may not be have access to real-time financial data that is provided by a corresponding financial institution. As discussed further below, systems and method for onboarding a new institution account for a user of ERP software are disclosed. The systems and methods leverage data from ERP software, CRM software, third-party data, and/or real time financial data to pull the information needed to onboard a new account of the institution.

Figure 9:
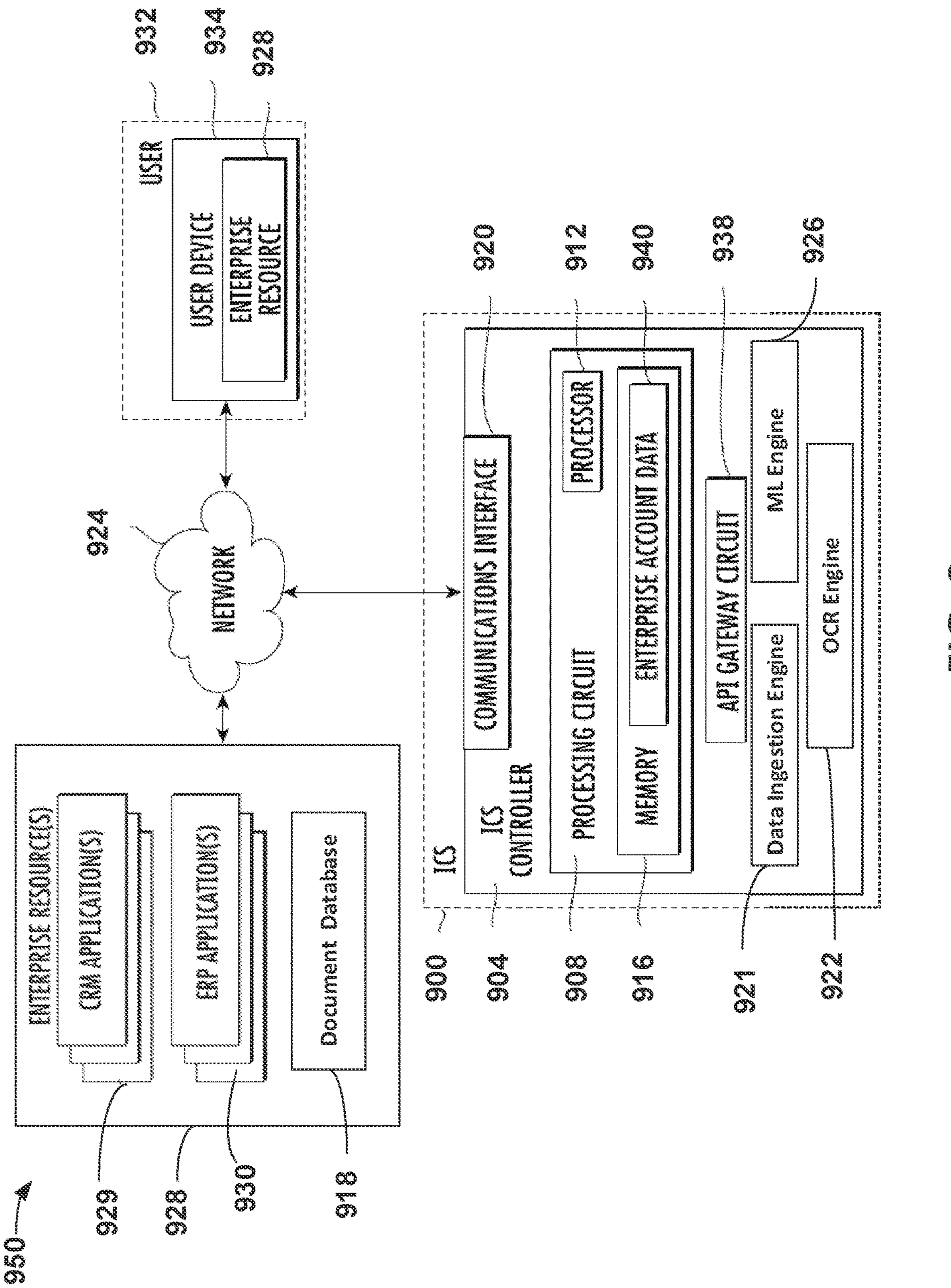
FIG. 9 is a system schematic diagram of another computing system, according to an exemplary embodiment.

Referring now to FIG. 9, a schematic diagram of a computing system 950 is shown, according to an exemplary embodiment. The computing system 950 may share one or more characteristics as any of the other computing systems described herein. For example, the computing system 950 is shown to include an institution computing system (ICS) 900, which includes an ICS controller 904. The ICS controller 904 includes a processing circuit 908, having a processor 912 and a memory 916. The ICS controller 904 may also include, and the processing circuit 908 may be communicably coupled to, a communications interface 920 such that the processing circuit 908 may send and receive content and data via the communications interface 920. As such, the ICS controller 904 may be structured to communicate via one or more networks 924 with other devices and/or applications. The computing system 950 is shown to include enterprise resources 928 including a plurality of CRM applications 929 and a plurality of ERP applications 930, and a user device 934 accessing an enterprise resource 928 (which may be one of the enterprise resources 928). In some embodiments, the ICS controller 904, the enterprise resources 928, and the user device 934 may be communicably coupled and configured to exchange data over the network 924, which may include one or more of the Internet, cellular network, Wi-Fi, Wi-Max, a proprietary banking network, a proprietary retail or service provider network, or other type of wired or wireless network. The ICS controller 904 may be configured to transmit, receive, exchange, or otherwise provide data to one or more of the enterprise resources 928.

The ICS controller 904 is shown to include an application programming interface (API) gateway circuit 938. The API gateway circuit 938 may be configured to facilitate the transmission, receipt, and/or exchange of data between the ICS controller 904 and the enterprise resources 928. Referring to FIG. 9 generally, the ICS controller 904 is associated with (e.g., owned, managed, and/or operated by) the institution computing system (ICS) 900. As is described further herein, the API gateway circuit 938 may include one or more APIs configured to pull data from the enterprise resources 928 (e.g., the document database 918). For example, the API gateway circuit 938 may pull one or more documents (e.g., invoices, generated invoices, etc.) from the document database 918 and provide the one or more documents to an Optical Character Recognition (OCR) engine 922 for further processing.

In the example depicted, the ICS 900 is a computing system configured to maintain data or content relating to one or more one or more enterprises (e.g., enterprise account data 940). According to the embodiments described herein, the ICS 900 may be configured to transmit existing enterprise account data 940 to one or more enterprise resources 928. For example, the ICS 900 may be configured to provide various content and data relating to different institution accounts, such as general ledger accounts, lending, money transfers, issuing credit or debit, etc. Thus, the ICS controller 904 is structured or configured to maintain and provide, or otherwise facilitate providing, the content and data (e.g., the enterprise account data 940) to devices and/or applications associated with internal or external users (e.g., users having an account with the institution corresponding to the ICS 900, users seeking to establish an account with the institution, etc.). In some embodiments, the ICS controller 904 is structured or configured control access to the enterprise account data 940 (e.g., by authenticating an enterprise resource 928 or a user of the enterprise resource 928).

As shown in FIG. 9, the ICS controller 904 is shown to include the processing circuit 908, including the processor 912 and the memory 916. The processing circuit 908 may be structured or configured to execute or implement the instructions, commands, and/or control processes described herein with respect to the processor 912 and/or the memory 916. FIG. 9 shows a configuration that represents an arrangement where the processor 912 is embodied in a machine or computer readable media, as described below. However, FIG. 9 is not meant to be limiting as the present disclosure contemplates other embodiments, such as where the processor 912, or at least one circuit of processing circuit 908 (or ICS controller 104), is configured as a hardware unit. All such combinations and variations are intended to fall within the scope of the present disclosure.

The processing circuit 908 is shown to include one or more processors 912. The processor(s) 912 may be implemented or performed with a general purpose single- or multi-chip processor, a digital signal processor (DSP), an application specific integrated circuit (ASIC), one or more field programmable gate array (FPGAs), or other suitable electronic processing components. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the circuits of the processor 912 may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The processing circuit 908 is also shown to include the memory 916. The memory 916 (e.g., memory, memory unit, storage device, etc.) may include one or more devices (e.g., RAM, ROM, Flash memory, hard disk storage, etc.) for storing data and/or computer code for completing or facilitating the processes, layers, and modules described in the present application. The memory 916 may be or include tangible, non-transient volatile memory or non-volatile memory. The memory 916 may also include database components, object code components, script components, or any other type of information structure for supporting the activities and information structures described in the present application. According to an exemplary embodiment, the memory 916 is communicably connected to the processor 912 via the processing circuit 908 and includes computer code for executing (e.g., by the processing circuit 908 and/or the processor 912) one or more processes described herein.

The memory 916 is configured to store various data (e.g., some or all of the data required to perform the method 1000 described below). For example, the memory 916 may store previously recorded data (e.g., previous invoice payment dates, previous invoice payment amounts, historic account balances, etc.), current financial data (e.g., an account balance, outstanding invoices, accounts receivable, etc.), and anticipated financial events (e.g., scheduled invoice payment dates, schedule payment request dates, etc.). As is further described below, the memory 916 may only store necessary data provided a data ingestion engine 921. For example, the data ingestion engine 921 may cause the memory 916 to store only data entries required to onboard a new user of the ERP application 930 such that unnecessary data pulled (e.g., by one or more API calls) is not stored on the memory 916, which may reduce computational power required to onboard a new account of the ICS 900 and/or the ERP Application 930, thus reducing the total number of API calls.

The computing system 950 may include or access various third-party source(s) 955. The third-party source(s) 955 may be or include any data source which collects, stores, or otherwise maintains data accessible by other entities (such as the ICS controller 904/enterprise resources 928, etc.). The third-party data source(s) 955 may include data brokers, data marketplaces, external APIs, etc. As one example, the third-party data source(s) 955 may be configured to store or maintain data on businesses, including information on company profiles, financials, credit ratings, industry classifications, and the like. Such data may be collected by the third-party data source(s) 955 from public records, trade references, etc.

As shown in FIG. 9, the ICS controller 904 is also shown to include an application programming interface (API) gateway circuit 938. In some embodiments, the external devices (e.g., CRM application(s) 929 or ERP application(s) 930 of the enterprise resources 928, user device 934 having enterprise resource 928, third-party source(s) 955, etc.) may include API protocols that are used to establish an API session between the ICS controller 904 and the external devices. In this regard, the API protocols and/or sessions may allow the ICS 900 to communicate content and data (e.g., associated with the institution's products and/or services) to be displayed directly within the external devices (e.g., CRM application(s) 929, ERP application(s) 930, user device 934, etc.). For example, the external device may activate an API protocol (e.g., via an API call), which may be communicated to the ICS controller 904 via the network 924 and the communications interface 920. The API gateway circuit 938 may receive the API call from the ICS controller 904, and the API gateway circuit 938 may process and respond to the API call by providing API response data. The API response data may be communicated to the external device via the ICS controller 904, communications interface 920 and the network 924. The external device may then access (e.g., display) the API response data (e.g., associated with the ICS 900 product and/or service) on the external device.

As such, the API gateway circuit 938 is structured to initiate, receive, process, and/or respond to API calls (e.g., via the ICS controller 904 and the communications interface 920) over the network 924. That is, the API gateway circuit 938 may be configured to facilitate the communication and exchange of content and data between the external devices (e.g., CRM applications 929, ERP applications 930, user device 934, etc.) and the ICS controller 904. Accordingly, to process various API calls, the API gateway circuit 938 may receive, process, and respond to API calls using other circuits. Additionally, the API gateway circuit 938 may be structured to receive communications (e.g., API calls, API response data, etc.) from other circuits. That is, other circuits may communicate content and data to the ICS controller 904 via the API gateway circuit 938. Therefore, the API gateway circuit 938 is communicatively coupled other circuits of the ICS controller 904, either tangibly via hardware, or indirectly via software.

The ICS 900 is further shown to include a data ingestion engine 921. The data ingestion engine 921 is configured to receive or otherwise retrieve data, such as invoice data or financial data, associated with the user of the enterprise resources 928 and/or from the ICS 900. For example, the data ingesting engine 921 may receive data via one or more API calls in response to receiving a request to onboard a new account. Further, the data ingestion engine 921 may periodically receive data via one or more API calls after the new account is set up. For example, the financial institution may require periodic updates for current data for compliance purposes.

The data may include various data required to onboard a new account. For example, the data may include a tax ID or other tax information that can be gathered from an ERP application. Further, the data may include address, such as a corporate headquarters, that can be gathered from the ERP application. The data may include various customer information and/or sales information that can be gathered from the CRM application. The data may include datasets including data entries that define one or more characteristics of an invoice, such as an amount, due date, and one or more trade terms associated with payment of the invoice. Further, the data may include datasets including data entries that define one or more financial characteristics of the user, such as an account balance, payments made, etc.). For example, the data ingestion engine 921 may receive invoice data (e.g., invoice datasets) that is pulled via API calls from the ERP application 930 and/or the CRM application 929 as described below. Further, the data ingestion engine 921 may receive financial data that is polled from a financial intuition computing system, as is discussed further herein. Additionally, the data ingestion engine 921 may be configured to receive financial data that is polled or retrieved from the third-party source(s) 955.

The ICS 900 is further shown to include a machine learning (ML) engine 926. The ML engine 926 is configured to determine which datasets include data entries required to onboard a new user account. The ML engine 926 is further configured to optimize a plurality of datasets (e.g., invoice datasets) and output an optimized subset of the data entries for onboarding a new user of the ERP application 930. For example, the ML engine 926 may receive a plurality of datasets that are pulled via API calls from the ERP application 930. The ML engine 926 may then begin with an initial subset of the dataset. For example, initial subset of datasets may be randomized. Alternatively, the initial subset may include a predetermined number of the most recent datasets. The initial subset is used as an input to the ML engine 926 along with other inputs such as financial data (e.g., predicted financial data, current account balance, etc.) and/or data accompanying the request to establish a new account.

After initialization, the ML engine 926 evaluates the initial subset of datasets. For example, the ML engine 926 may use the initial inputs to predict or determine if the initial subset includes all necessary data entries and/or how many unneeded data entries are included in the initial subset of datasets. The ML engine 926 may determine a score for the initial subset of datasets. According to various embodiments, an optimized subset of datasets will have a higher score than a non-optimized subset of datasets. For example, a higher score may indicate that subset of datasets includes the required data entries and a relatively low number of unnecessary data entries. Further, the ML Engine 926 may assign a score to each individual dataset of the initial subset of datasets. A dataset with a higher score may include a relatively high number of required data entries and a relatively now number of unnecessary data entries.

After the initial evaluation, the ML engine 926 may select one or more data entries of the initial dataset to fix and alternative datasets may be added to a second subset of datasets. For example, datasets with higher scores may be fixed and data entries with lower scores may be removed from the subset of datasets. Some or all of the remaining datasets may then be adjusted by the ML engine 926 and another iteration of steps (e.g., as described above) may be performed until a maximized score is determined. The iteration with the maximum score may be the optimized subset of datasets.

The ICS 900 is further shown to include an OCR engine 922. The OCR engine 922 is configured to distinguish printed or handwritten text characters inside digital images of physical documents, such as a scanned document. For example, documents received from the institution computing system and/or the enterprise resources 928 may be provided to the OCR engine 922 such that datasets may be extracted from the various documents and provided to the ML engine 926 and/or the data ingestion engine 921.

According to various embodiments, the ICS 900 is configured to receive a request to onboard a new user account associated with an ERP application 930. In response to receiving the request, the ICS 900 may determine a dataset required to onboard a new user account using data from the ERP application 930 (e.g., as required by the financial institution's Know Your Customer (KYC) program). For example, a dataset including a first data entry and a second data entry may be required to onboard a new user account with the ICS 900/ERP application 930. The dataset may include various data, such as previously recorded data (e.g., historic account balances, historic tax filings, payment history, payments received history, financing information, etc.), current financial data (e.g., a current account balance, outstanding financial obligations, etc.), and anticipated financial event data (e.g., scheduled invoice payment dates).

The ICS 900 is further configured to poll one or more servers of the institution computing system corresponding to the ICS 900 for various data. For example, after determining the dataset required to onboard the new user account with the ICS 900/ERP application 930, the ICS may poll the one or more servers of the institution computing system. For example, the user applying for a new account with the ERP application 930 may be have one or more accounts with the financial institution. The financial institution may store financial data associated with the user. The ICS 900 is configured to poll the stored financial data (e.g., accounts receivable, accounts payable, account balance, liquid assets, assets, etc.) and provide the polled data to a data ingestion engine 921 to pull a required data entry (e.g., the first data entry) that is stored by the financial institution computing system.

In the example depicted, the ICS 900 is further configured to transmit a query to an API of the API gateway circuit 938 for the enterprise resources 928. The query may include a request for a data entry (e.g., the second data entry) used to onboard a new user of the ERP application 930. For example, the API is configured to gather information from an existing ERP application 930 utilized by the user, an existing CRM application 929 utilized by the user, and/or a document database 918 maintained by the user, third-party sources 955 relating to the customer or business associated with the user, etc. In response to receiving the query, the API may pull the required data entries (e.g., the second data entry). According to various embodiments, the ICS 900 (e.g., via the API) leverages a machine learning (ML) engine 926 to determine which data entries to provide to a data ingestion engine 921 for further processing, as is discussed further herein.

In some embodiments, the ICS controller 904 may be implemented within a single computer (e.g., one server, one housing, etc.). In other embodiments, the ICS controller 904 may be distributed across multiple servers or computers, such as a group of two or more computing devices/servers, a distributed computing network, a cloud computing network, and/or any other type of computing system capable of accessing and communicating via local and/or global networks (e.g., the network 924). Further, while FIG. 9 shows applications outside of the ICS controller 904 (e.g., the network 924, the enterprise resources 928, etc.), in some embodiments, one or more of the enterprise resources 928 may be hosted within the ICS controller 904 (e.g., within the memory 916).

Still referring to FIG. 9, the computing system 950 may further include a plurality of enterprise resources 928. The enterprise resources 928 may be or include various systems or applications which are provided to an enterprise (e.g., by one or more service providers of the enterprise resource(s) 928). The enterprise resources 928 may be configured to facilitate management of resources corresponding to various entities in various industries. The enterprise resources 928 is shown to include a plurality of customer relationship management (CRM) applications 929. The CRM applications 929 may be or include applications for establishing leads on new customers, assisting in converting a lead to a sale, planning delivery, and so forth. The enterprise resources 928 is shown to include a plurality of ERP applications 930. The ERP applications 930 may include human resources (HR) or payroll applications, marketing applications, customer service applications, operations/project/supply chain management applications, commerce design applications, accounting systems, treasury management platforms, and the like.

The enterprise resources 928 is shown to further include invoice a document database 918. The document database 918 is configured to various documents (e.g., invoices, statements, accounts receivable, etc.) received by or otherwise accessed by the CRM applications 929, the ERP applications 930, or any other enterprise resource 928. The documents may be generated by the enterprise (e.g., sent to a customer as a bill) and/or sent to the enterprise (e.g., sent to the enterprise as a bill). For example, the document database 918 may stores one or more invoice datasets for each invoice. According to various embodiments, each invoice dataset includes a plurality of data entries corresponding to respective invoices. Each data entry of the plurality of data entries may define an amount, due date, and one or more trade terms associated with payment of the invoice. According to various embodiments, the invoice data (e.g., invoice datasets) is pulled via API calls from the ERP application 930 as described herein.

The enterprise resources 928 may be implemented on or otherwise hosted on a computing system, such as a discrete server, a group of two or more computing devices/servers, a distributed computing network, a cloud computing network, and/or another type of computing system capable of accessing and communicating using local and/or global networks (e.g., the network 924). Such computing system hosting the enterprise resources 928 may be maintained by a service provider corresponding to the enterprise resource(s) 928. The enterprise resources 928 may be accessible by various computing devices or user devices associated with an enterprise responsive to enrollment of the enterprise with the enterprise resources 928. The CRM applications 929 and/or the ERP applications 930 may include software and/or hardware capable of implementing a network-based or web-based applications (e.g., closed-source and/or open-source software like HTML, XML, WML, SGML, PUP, CGI, Dexterity, TypeScript, Node, etc.). Such software and/or hardware may be updated, revised, or otherwise maintained by resource or service providers of the enterprise resources 928. The CRM and ERP application(s) 929, 930 may be accessible by a representative(s) of a small or large business entity, any customer of the institution, and/or any registered (or unregistered) user of the products and/or service provided by one or more components of the computing system 950. As such, the enterprise resources 928 (including the CRM application(s) 929 and/or the ERP application(s) 930) may be or include a platform (or software suite) provided by one or more service providers which is accessible by an enterprise having an existing account with the ICS 900. In some instances, the enterprise resources 928 may be accessible by an enterprise that does not have an existing account with the ICS 900, but may open or otherwise onboard a new account via the ICS 900 using a CRM application 929 and/or an ERP application 930 of the enterprise resources 928.

The enterprise resources 928 may be configured to establish connections with other systems in the computing system 950 (e.g., the ICS 900, the user device 934, etc.) via the network 924. Accordingly, the CRM application(s) 929 and/or ERP application(s) 930 of the enterprise resources 928 may be configured to transmit and/or receive content and data to and/or from the ICS controller 904 (e.g., via the communications interface 920) over the network 924. For example, and as described in greater detail below, an ERP application 930 (or CRM application 929) may activate an API protocol (e.g., via an API call) associated with the ICS 900 (e.g., to open an account, to request or apply for a loan instrument, to verify or determine an account balance, etc.). The API call may be communicated to the ICS controller 904 via the network 924 and the communications interface 920. The ICS controller 904 (e.g., the API gateway circuit 938) may receive, process, and respond to the API call by providing API response data. The API response data may be communicated to the ERP application 930 (or CRM application 929) via the communications interface 920 and the network 924, and the ERP application 930 (or CRM application 929) may access (e.g., analyze, display, review, etc.) the content and data received from the ICS 900.

In an exemplary embodiment, the enterprise resources 928 may be configured to include an interface that displays the content and data communicated from the ICS controller 904. For example, the enterprise resources 928 may include a graphical user interface, a mobile user interface, or any other suitable interface that may display the content and data (e.g., associated with products and services of the ICS 900) to the enterprise resources 928. In this regard, enterprise resources 928, and entities associated with the enterprise resources 928 (e.g., customers, employees, shareholders, policy holders, etc.), may access, view, analyze, etc. the content and data transmitted by the ICS controller 904 remotely using the enterprise resources 928. Further, a user may be able to approve or deny one or more data requests (e.g., a query from an API of the ICS 900) received.

Still referring to FIG. 9, the computing system 950 may further include a user device 934 associated e.g., owned by, used by, etc. with a user 932. The user device 934 may be or include a mobile phone, a tablet, a laptop, a desktop computer, an IoT-enabled device (e.g., an IoT-enabled smart car), a wearable device, a virtual/augmented reality (VR/AR) device, and/or other suitable user computing devices capable of accessing and communicating using local and/or global networks (e.g., the network 924). In an exemplary embodiment, the user 932 may be a customer or client of the ICS 900 associated with the ICS controller 904 (e.g., a user having access to one or more accounts of another entity, such as a business or enterprise, another individual, etc.).

The user device 934 may be configured to establish connections with other systems in the computing system 950 (e.g., ICS 900, enterprise resources 928, etc.) via the network 924. Accordingly, the user device 934 may be able to transmit and/or receive content and data to and/or from the ICS controller 904 (e.g., via the communications interface 920) over the network 924. In some embodiments, the user device 934 may be able to transmit and/or receive content and data to and/or from the enterprise resources 928 over the network 924. In an exemplary embodiment, the user device 934 may include software and/or hardware capable of accessing a network-based or web-based application. For example, in some instances, the user device 934 may include an application that includes (closed-source and/or open-source) software such as HTML, XML, WML, SGML, PUP (Hypertext Preprocessor), CGI, Dexterity, TypeScript, Node, etc.

As shown in FIG. 9, the user device 934 is also shown to access an enterprise resource 928, which may be or include one or more of the enterprise resources 928 described herein (e.g., a CRM application 929, an ERP application 930). For example, a user of the enterprise resource 928 may provide log-in credentials associated with an enterprise, to access the corresponding enterprise resource 928. In some embodiments, the enterprise resource 928 may be a standalone application. In some embodiments, the enterprise resource 928 may be incorporated into one or more existing applications of the user device 934. The enterprise resource 928 may be downloaded by the user device 934 prior to its usage, hard coded in the user device 934, and/or be a network-based or web-based interface application. In this regard, the ICS controller 904 may provide content and data (e.g., relating to the ICS 900 products or services) to the enterprise resource 928 via the network 924, for displaying at the user device 934. The enterprise resource 928 may receive the content and data (e.g., directly from the ICS controller 904, or indirectly from the ICS controller 904), and the user device 934 may process and display the content and data remotely to the user through the enterprise resource 928 displayed at the user device 934.

The user device 934 may configured to display one or more data request and receive a user input to approve or deny one or more data requests (e.g., a query from an API of the ICS 900) received. For example, during an API call, the ICS 900 may attempt to access documents stored in the document database 918. One or more of the documents may include a document tag that indicates approval is needed to share the document. In response, a notification may be displayed on the user device 932 that requests a user input before the document is shared. In response to receiving approval to share the document from the user device 934, the enterprise resources 928 may allow the API to access the document.

Further, the user device 934 may provide inputs to the ICS 900. For example, a user of the user device 934 may interact with a user interface on the user device 934, which may in turn send an update to the ICS 900. For example, the user may select one or more documents on the user device 934 to provide to the ICS 900. According to various embodiments, the datasets associated with the documents selected on user device 934 may be used as fixed inputs for the ML Engine 926, as described further herein.

In some embodiments, the user device 934 may prompt the user 932 to log onto or access a web-based interface before using the enterprise resource 928. Further, prior to use of the enterprise resource 928, and/or at various points throughout the use of the enterprise resource 928, the user device 934 may prompt the user 932 to provide various authentication information or log-in credentials (e.g., password, a personal identification number (PIN), a fingerprint scan, a retinal scan, a voice sample, a face scan, any other type of biometric security scan) to ensure that the user 932 associated with the user device 934 is authorized to use the enterprise resource 928 and/or permit the ICS to access the ERP data.

In an exemplary embodiment, an enterprise resource 928 accessed via the user device 934 may be configured to transmit, send, receive, communicate, or otherwise exchange data with the ICS 900. For example, an ERP application 930 (e.g., or CRM application 929) may have an option for viewing account information relating to accounts with the ICS 900. The user 932 of the user device 934 (e.g., a registered user having an account with the institution corresponding to the ICS 900) may select the option on the ERP application 930 to view the account information of the user 932 within the ERP application 930. The ERP application 930 may activate an API protocol (e.g., via an API call) to request the information from the ICS controller 904 corresponding to the account information. The ERP application 930 may communicate the API call to the ICS controller 904 via the network 924 and the communications interface 920. The ICS controller 904 (e.g., the API gateway circuit 938) may receive, process, and respond to the API call to provide API response data. For example, responsive to the ERP application 930 (or ICS controller 904) authenticating the user 932 as described herein, the ERP application 930 may transmit data corresponding to the user (e.g., a user identifier) with the API call to the ICS controller 904. The ICS controller 904 may perform a look-up function in an accounts database using the user identifier from the API call to generate the API response data including the enterprise account data 940. The API response data may be communicated to the ERP application 930 via the communications interface and the network 924. In some embodiments, the ERP application 930 may display the response data to the user 932 (e.g., via the ERP application(s) 930), such as the enterprise account data 940.

Similarly, the user device 934 may communicate with the ICS 900, via the network 924, requesting enterprise resource 928 data (e.g., data from a CRM application 929, data from an ERP application 930, etc.) to view on a page associated with the ICS 900. For example, the user device 934 may display a page or user interface corresponding to the ICS 900 that includes an option for viewing analytics on conversion of leads to sales from the CRM application 929. The user device 934 may receive a selection of the option, and initiate a request for the ICS 900 to request the customer information from the CRM application 929. The ICS 900 (e.g., the ICS controller 904 via the communications interface 920) may process the request from the user device 934 (e.g., as discussed herein), and activate an API protocol (e.g., via an API call) associated with the request (i.e., and the CRM application 929, etc.). The API call may be communicated to the CRM application 929 via the network. The CRM application 929 may receive, process, and respond to the API call by providing API response data as described herein. The API response data may be communicated to the ICS 900 (e.g., the ICS controller 904 via the network and the communications interface 920). In some embodiments, a webpage or website (or application) associated with the ICS 900 may display the CRM data received from the CRM application 929 along with ICS data (e.g., account data, balances, etc.).

Figure 10:
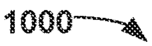
FIG. 10 is a flowchart showing a method for onboarding a new account, according to an example embodiment.
Figure 10:
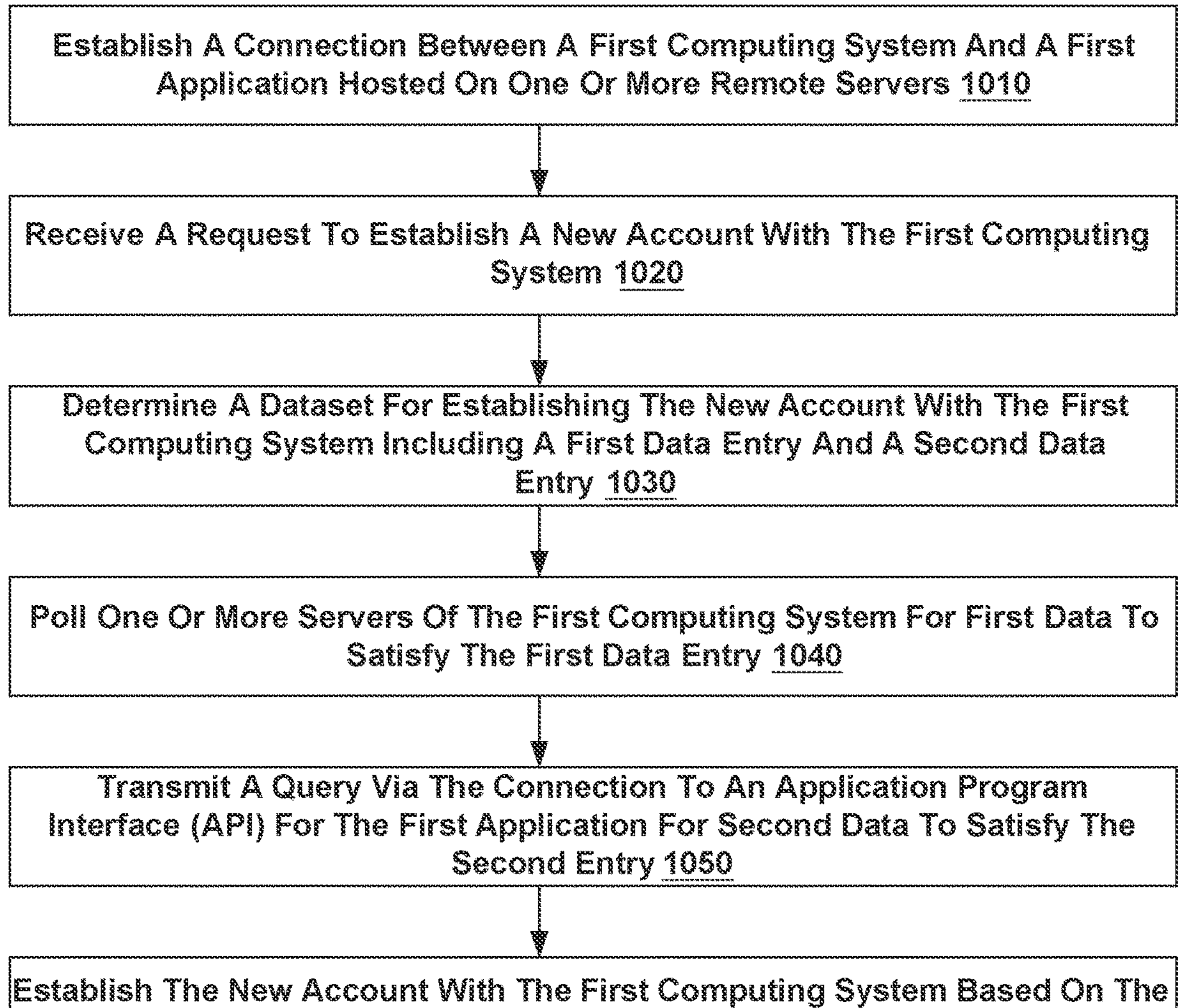

Referring now to FIG. 10, a flowchart of a method 1000 for onboarding a new user account is shown, according to an example embodiment. The method 1000 is configured to receive or pull transaction data (e.g., supplier trade terms, invoice data, trade terms, invoice discount data, invoice discount amount, invoice amount from another party, accounting data, supplier financing terms, equipment financing terms, treasure management account data, treasury management access privileges, lending data, market data, etc.) via one or more API calls from enterprise resources associated with the new user, financial data (e.g., various balances, expected or scheduled payments or transfers into or out of an account, etc.) from an institution computing system that maintains an account associated with the new user, and other datasets (such as data from various third-party source (s)), provide the received or retrieved data to an ICS, and complete the onboarding process for a new account associated with the user. In an example embodiment, the new account is an account with a financial institution, such as a savings account, a checking account, a loan account, a credit account, etc. In another example embodiment, the user may be transitioning from a first enterprise resource software provider that requires a first account to a second enterprise resource software provider that requires a second account (e.g., the new account). It should be appreciated that the method 1000 does not need to be performed in the order shown. Further, various steps may be omitted and additional steps may be included in the method 1000.

At step 1010, a connection is established between a first computing system and a first application hosted on one or more remote servers. According to various embodiments, the first application is associated with an entity (e.g., a business, an individual, etc.) that operates the remote computing system, wherein the entity has one or more first accounts with the first computing system (e.g., a financial computing system). The one or more first accounts may be financial accounts (e.g., savings account, credit account, checking account, etc.) with a financial institution. For example, an ICS controller may be configured to establish a connection between the remote server and the institution application corresponding to the ICS, as is discussed further herein.

In an example embodiment, the first account may be associated with an institution application (e.g., of the ICS 100). As discussed herein, the first computing system may include any combination of suitable computing systems or devices (e.g., the ICS 900, a discrete server, a group of two or more computing devices/servers, a distributed computing network, a cloud computing network, and/or another type of computing system capable of accessing and communicating using local and/or global network, etc.).

The first application may include a financial application associated with a financial institution. For example, the user may be opening a new financial account with the financial institution. In another example, the first application may include an enterprise resource application. For example, the user may be transitioning from the first application to a second application (e.g., an enterprise resource application associated with the new account). The remote computing system may include a computing system hosted by an entity and the first application may include one or more enterprise resources (e.g., the enterprise resources 928). The remote server may include any combination of suitable computing systems or devices (e.g., the user device 934, the enterprise resources 928, a discrete server, a group of two or more computing devices/servers, a distributed computing network, a cloud computing network, and/or another type of computing system capable of accessing and communicating using local and/or global network, etc.).

According to various embodiments, establishing the connection includes configuring the connection for access to a first type of data from the one or more remote servers while a second type of data from the one or more remote servers is inaccessible. For example, certain datasets may be restricted from access by the first computing system. For example, certain sensitive data may be inaccessible by the first computing system.

At step 1020, a request to establish a new account with the first computing system is received. For example, the first computing system may receive the request from the one or more remote servers after a connection is established at step 1010. The new account may be an account opened via the first computing system in response to gathering the data required to onboard the new account. According to various embodiments, the new account is hosted on the first computing system. Thus, according to various embodiments, the first account and the new account are hosted on the same computing system and operated by the same entity (e.g., the financial institution). However, according to other embodiments, the new account is hosted on one or more second computing systems that are separate from the first computing system.

According to various embodiments, the user requesting the new account may have associated with the first account with the first computing system. For example, the user may have a first account with a financial institution and the new account may be a second account with the financial institution. Further, according to various embodiments, the user requesting a new account has an existing account with another enterprise resource software provider. For example, the user may be switching from a first enterprise resource software provider to a second enterprise resource software provider such that the new account is associated with the second enterprise resource software provider. In this example, the user that operates the remote server may have access to one or more CRM applications and/or ERP applications prior to sending the request to establish a new account at step 1020. Further, the user may have access to a document database (e.g., the document database is stored on the remote server).

According to various embodiments, the request to establish a new account includes one or more new account indicators. For example, the request to establish a new account may include may include an account type indicator that indicates type of account the user is requesting to establish (e.g., a CRM account, an ERP account, etc.). Further, the new account may include an account history indicator that indicates whether or not the user has a current account with an enterprise resource software provider and/or an identity of a current enterprise resource software provider. Furthermore, the new account may include an existing financial account indicator that indicates if the entity has a financial account with the first computing system and/or information that identifies the account (e.g., account type, account number, etc.).

At step 1030, the first computing system determines a dataset (e.g., a required dataset) for establishing the new account with the first computing system, the dataset including a first data entry and a second data entry. For example, the first computing system may determine the information needed to onboard a new account for the user, such as transaction data (e.g., supplier trade terms, invoice data, trade terms, invoice discount data, invoice discount amount, invoice amount from another party, accounting data, supplier financing terms, equipment financing terms, treasure management account data, treasury management access privileges, lending data, market data, etc.), financial data (e.g., various balances, expected or scheduled payments or transfers into or out of an account, etc.), and other datasets. The first data entry may include financial data stored on the first computing system (e.g., the financial institution computing system). The second data entry may include transaction data stored by the user device and/or by one or more enterprise resources (e.g., the document database 918).

According to various embodiments, the first computing system determines the dataset for establishing the new account based on the one or more new account indicators included in the request to establish a new account. For example, a first dataset may be needed to onboard a new account with an CRM application and a second dataset, which is different from the first dataset, may be needed to onboard a new account with an ERP application.

At step 1040, one or more servers of the first computing system are polled or queried for first data to satisfy the first data entry. For example, the first data entry may include financial data that can be gathered from the one or more servers of the first computing system (e.g., the financial institution computing system). According to various embodiments, the first computing system is a financial institution computing system that stores financial data for a plurality of users, including the user that submitted the request to establish the new account. A controller (e.g., the ICS) may poll a subset of the financial data stored on the first computing system based on the financial account indicator. For example, the financial account indicator may identify a financial account associated with the entity requesting the new account and poll the data related to the financial account for the first data entry.

According to various embodiments, step 1040 may involve polling a plurality of data entries, including the first data entry. For example, the controller may polling as much of the dataset required for establishing a new account as possible. For example, the first computing system may both receive the request to establish a new account and host a financial account associated with the user. In this sense, the first computing system may have access to the financial data associated with the entity applying for the new account. By pulling the financial data internally, rather than submitting a request to a third party financial institution, the onboarding process may require less human intervention and reduce data transfer associated with sharing financial data between the third party data sources (e.g., another financial institution, enterprise resources, and/or third party data sources) and the first computing system.

After polling the first computing system for the first data, including the first data entry, the first computing system may determine the remaining data (e.g., a secondary dataset) required to onboard the requested account. For example, the secondary dataset may include the data entries of the required dataset less the data entries of the required dataset that were polled at step 1040.

At step 1050, a query is transmitted via the connection to an application program interface (API) for the first application for second data to satisfy the second data entry. The second data entry may be included in the secondary dataset described above. For example, the second data entry may include one or more data entries required to onboard a new account that was not polled at step 1040. For example, the second data may be accessible on the remote server and inaccessible on the one or more servers of the first computing system.

The second data may include a plurality of data entries corresponding to respective first application (e.g., an enterprise resource application). For example, the second data may include invoice data entries wherein each data entry includes an amount, due date, and one or more trade terms associated with payment of the invoice. For example, the second data may include a recipient identifier, a recipient name, an invoice number, an invoice amount, and so forth, and invoice due date, invoice late fees, etc.

In an exemplary embodiment, the first application (e.g., the ERP application 100, the CRM application 129, etc.) may receive the one or more API calls, and/or the additional data, via an API gateway circuit as a part of step 1050. For example, the first computing system may transmit a query via an application program interface (API) for the first application. The API gateway circuit may be configured to receive the one or more API calls, identify at least one of a plurality of circuits that is best configured to process the API call, and/or route the one or more API calls to the identified API circuit or circuits. The identified circuit (or circuits) may receive and/or process the API call, and provide second data (e.g., API response data) associated with the API call and/or the associated account holder. For example, the second data (e.g., API response data) may include account balance or transaction information for planning delivery payroll information, marketing information, customer service information, operations/project/supply chain management information, commerce design information, and/or any other suitable information associated with the first application (e.g., enterprise name, management information, principle place of business, tax information, etc.).

According to various embodiments, the first computing system may determine to poll the one or more servers for the first data and to transmit the query to the API for the first application for the second data, based on a first type of the first data and a second type of the second data. For example, the first type of the first data may include financial data and the second type of the second data may include enterprise resource data. The first computing system may analyze the required dataset and determine which data entries are financial data and which data entries are enterprise resource data and poll the servers of the first computing system for the financial data and transmit a query to the first application for the enterprise resource data accordingly.

According to various embodiments, the method 1000 further includes transmitting a second query to a second API for a third-party source for third data to satisfy a third query. For example, additional data (e.g., third data) that is not accessible via polling one or more servers of the first computing system or by transmitting a query via the connection an application interface for the first application may be gathered from the third party-source via the second API. In various embodiments, data from a treasury management system may be gathered via the second API. For example, treasury management access levels (e.g., parameters that define which accounts have access to treasury management accounts/products, which accounts are able to request new products or payments, which accounts are able to approve requests, etc.). In various embodiments, data from a human resource system may be gathered via the second API (e.g., data defining management structure within the entity, data regarding lending, data regarding markets, etc.). In various embodiments, data from an accounting system may be gathered via the second API (e.g., accounting information related to entities that do not maintain an account with the institution, equipment financing data, supply chain finance data, etc.).

According to various embodiments, a user device may prompt a user to log onto or access a web-based interface before accessing the third data. Further, prior to use of the third party source, and/or at various points throughout the use of the third party source, the user device may prompt the user to provide various authentication information or log-in credentials (e.g., password, a personal identification number (PIN), a fingerprint scan, a retinal scan, a voice sample, a face scan, any other type of biometric security scan) to ensure that the user associated with the user device is authorized to use the third party source and/or permit the ICS to access the third-party data.

As described above, step 1050 may leverage a data ingestion engine, a ML engine, and/or an OCR engine to retrieve the secondary dataset, including the second data entry, while minimizing the amount of unneeded data. For example, the ML engine (e.g., the ML engine 926) may be configured to determine which datasets accessible by the first application (e.g., datasets stored in the document database) include data entries (e.g., the secondary dataset) required to onboard a new user account. According to various embodiments, leveraging a ML model to optimize the datasets stored on the first computing system may reduce the required computing capacity to complete the onboarding process by reducing the data transferred to and saved by the first computing system Further, some users may request that only the data needed be shared with the first computing system. Leveraging a ML model to optimize the datasets stored may reduce the amount of unnecessary data provided the ICS.

According to various embodiments, the method 1000 includes applying a policy for access rights by a user of the computing device via the connection to the first application hosted on the one or more remote servers, to determine whether the user is permitted to access the first data and the second data. For example, certain data and/or certain data types may be indicated as private by a user of the computing device. According to various embodiments, the policy for access rights is provided to the first computing system as a part of the new account request. Additionally or alternatively, a first policy set, including access rights for a plurality of users including the user, may be retrieved from the first computing system. For example, the first computing system may store the policy set, which may be associated with the financial account associated with the user.

At step 1060, the new account with the first computing system is established based on the first data and the second data. For example, the new account may be an enterprise resource account provided by an entity associated with the first computing system. The first data and the second data, which is gathered by the first computing system rather than being pushed to the first computing system, may include some or all of the data entries required to onboard the new account. As such, the onboarding process may be completed with little manual intervention, thereby accelerating the onboarding process.

It should be appreciated that, according to various embodiments, additional data beyond the first data and the second data may be required to onboard the new account. In these embodiments, addition data may be pushed to the first computing system to complete the onboarding process. For example, a user interface may be generated and provided to the a user device (e.g., the computing device that submitted the new account request at step 1020), the user interface including a request for the third data.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include software for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

Accordingly, the "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quadcore processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed:

1. A method comprising:

establishing, by one or more processors of a first computing system, a connection between the first computing system and a first application hosted on one or more remote servers, the first computing system including an application program interface (API) gateway circuit configured to facilitate integration between one or more APIs of the first computing system, the first application hosted on the one or more remote servers, and a plurality of third-party data sources including one or more data brokers or external APIs;

retrieving, by the one or more processors, responsive to establishing the connection, a policy set from the first computing system, the policy set comprising access rights for a plurality of users;

receiving, by the one or more processors, from a computing device, a request to establish a new account with the first computing system;

determining, by the one or more processors, a dataset for establishing the new account with the first computing system, the dataset comprising a first data entry and a second data entry;

polling, by the one or more processors, one or more servers of the first computing system for first data to satisfy the first data entry;

transmitting, by the one or more processors and via the API gateway circuit, an API call via the connection to an API for the first application and at least one of the plurality of third-party data sources for second data to satisfy the second data entry;

responsive to receiving the API call via the connection, identifying, by the one or more processors via the API gateway circuit, at least one circuit of a plurality of circuits within the API gateway circuit based on a type associated with the second data, each of the plurality of circuits configured to determine the second data to satisfy the second data entry of the dataset using API response data;

routing, by the one or more processors via the API gateway circuit, the API response data from the API call to the at least one circuit;

determining, by the one or more processors via the at least one circuit, the second data for satisfying the second data entry based on the API response data;

applying, by the one or more processors, a policy of the policy set for access rights by a user of the computing device via the connection to the first application hosted on the one or more remote servers, to determine whether the user is permitted to access the first data and the second data;

authenticating, by the one or more processors via a second circuit of the API gateway circuit, the user based on one or more modalities input into the first application to allow access to the second data according to the policy; and establishing, by the one or more processors, the new account with the first computing system based on the first data and the second data upon successful validation of the user.

2. The method of claim 1, further comprising:

determining, by the one or more processors, to poll the one or more servers for the first data and to transmit the API call to the API for the first application for the second data, based on a first type of the first data and a second type of the second data.

3. The method of claim 1, wherein the first application is an enterprise resource planning (ERP) application.

4. The method of claim 1, wherein establishing the connection comprises configuring, by the one or more processors, the connection for access to a first type of data from the one or more remote servers while a second type of data from the one or more remote servers is inaccessible.

5. The method of claim 1, further comprising:

transmitting, by the one or more processors, a second API call to a second API for a third-party source, for third data to satisfy a third data entry.

6. The method of claim 1, wherein an entity corresponding to the computing device maintains a first account with the first computing system, the new account is a second account with the first computing system, the method further comprising:

retrieving, by the one or more processors, data from the first account for establishing the second account with the first computing system.

7. The method of claim 1, further comprising:

transmitting, by the one or more processors, a user interface to the computing device, the user interface identifying the first data, the second data, and requesting third data from a user of the computing device for establishing the new account; and receiving, by the one or more processors, a confirmation of the first data and the second data, and the third data from the user of the computing device.

8. A computing system comprising:

one or more processors configured to:

establish a connection between the computing system and a first application hosted on one or more remote servers, the computing system including an application program interface (API) gateway circuit configured to facilitate integration between one or more APIs of the computing system, the first application hosted on the one or more remote servers, and a plurality of third-party data sources including one or more data brokers or external APIs;

retrieve, responsive to establishing the connection, a policy set from the computing system, the policy set comprising access rights for a plurality of users;

receive, from a computing device, a request to establish a new account with the computing system;

determine a dataset for establishing the new account with the computing system, the dataset comprising a first data entry and a second data entry;

poll one or more servers of the computing system for first data to satisfy the first data entry;

transmit, via the API gateway circuit, an API call via the connection to an API for the first application and at least one of the plurality of third-party data sources for second data to satisfy the second data entry;

responsive to receiving the API call via the connection, identify, via the API gateway circuit, at least one circuit of a plurality of circuits within the API gateway circuit based on a type associated with the second data, each of the plurality of circuits configured to determine the second data to satisfy the second data entry of the dataset using API response data;

route, via the API gateway circuit, the API response data from the API call to the at least one circuit;

determine, via the at least one circuit, the second data for satisfying the second data entry based on the API response data;

apply a policy of the policy set for access rights by a user of the computing device via the connection to the first application hosted on the one or more remote servers, to determine whether the user is permitted to access the first data and the second data;

authenticate, via a second circuit of the API gateway circuit, the user based on one or more modalities input into the first application to allow access to the second data according to the policy; and establish the new account with the computing system based on the first data and the second data upon successful validation of the user.

9. The computing system of claim 8, wherein the one or more processors are configured to:

determine to poll the one or more servers for the first data and to transmit the API call to the API for the first application for the second data, based on a first type of the first data and a second type of the second data.

10. The computing system of claim 8, wherein the first application is an enterprise resource planning (ERP) application.

11. The computing system of claim 8, wherein, to establish the connection, the one or more processors are configured to configure the connection for access to a first type of data from the one or more remote servers while a second type of data from the one or more remote servers is inaccessible.

12. The computing system of claim 8, wherein the one or more processors are configured to transmit a second API call to a second API for a third-party source, for third data to satisfy a third data entry.

13. The computing system of claim 8, wherein the one or more processors are configured to:

transmit a user interface to the computing device, the user interface identifying the first data, the second data, and requesting third data from a user of the computing device for establishing the new account; and receive a confirmation of the first data and the second data, and the third data from the user of the computing device.

14. A non-transitory computer readable medium storing instructions that, when executed by one or more processors, cause the one or more processors to:

establish a connection between a computing system and a first application hosted on one or more remote servers, the computing system including an application program interface (API) gateway circuit configured to facilitate integration between one or more APIs of the computing system, the first application hosted on the one or more remote servers, and a plurality of third-party data sources including one or more data brokers or external APIs;

retrieve, responsive to establishing the connection, a policy set from the computing system, the policy set comprising access rights for a plurality of users;

receive, from a computing device, a request to establish a new account with the computing system;

determine a dataset for establishing the new account with the computing system, the dataset comprising a first data entry and a second data entry;

poll one or more servers of the computing system for first data to satisfy the first data entry;

transmit, via the API gateway circuit, an API call via the connection to an API for the first application and at least one of the plurality of third-party data sources for second data to satisfy the second data entry;

responsive to receiving the API call via the connection, identify, via the API gateway circuit, at least one circuit of a plurality of circuits within the API gateway circuit based on a type associated with the second data, each of the plurality of circuits configured to determine the second data to satisfy the second data entry of the dataset using API response data;

route, via the API gateway circuit, the API response data from the API call to the at least one circuit;

determine, via the at least one circuit, the second data for satisfying the second data entry based on the API response data;

apply a policy of the policy set for access rights by a user of the computing device via the connection to the first application hosted on the one or more remote servers, to determine whether the user is permitted to access the first data and the second data;

authenticate, via a second circuit of the API gateway circuit, a user in accordance with one or more modalities input into the first application to allow access to the second data; and establish the new account with the computing system based on the first data and the second data upon successful validation of the user.

* * * * *